US012712592B2

(12) United States Patent
Qian et al.

(10) Patent No.: US 12,712,592 B2
(45) Date of Patent: Aug. 18, 2026

(54) SIGNAL TRANSMISSION METHOD AND RELATED APPARATUS

(71) Applicant: HUAWEI TECHNOLOGIES CO., LTD., Guangdong (CN)

(72) Inventors: Bin Qian, Shenzhen (CN); Chenchen Liu, Shenzhen (CN); Xun Yang, Singapore (SG); Kuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 18/825,243

(22) Filed: Sep. 5, 2024

(65) Prior Publication Data

US 2024/0429967 A1 Dec. 26, 2024

Related U.S. Application Data

(63) Continuation of application No. PCT/CN2023/078875, filed on Feb. 28, 2023.

(30) Foreign Application Priority Data

Mar. 7, 2022 (CN) ........................ 202210225959.X

(51) Int. Cl.
*H04B 1/717* (2011.01)

(52) U.S. Cl.
CPC . *H04B 1/7174* (2013.01); *H04B 2201/71634* (2013.01)

(58) Field of Classification Search
CPC ........ H04B 1/7174; H04B 2201/71634; H04B 1/7163; H04W 4/02; H04W 64/00;
(Continued)

(56) References Cited

U.S. PATENT DOCUMENTS

2011/0044312 A1 2/2011 Lee et al.
2020/0100283 A1* 3/2020 Naguib .................. G01S 11/06
(Continued)

FOREIGN PATENT DOCUMENTS

JP 2020053965 A 4/2020
WO 2020145526 A1 7/2020

OTHER PUBLICATIONS

Kouno, "About UWB, the opportunity has finally has arrived to show the tips of new business creation," Nikkei Electronics, Nikkei BP 1220, Oct. 2020, 14 pages (with English abstract).
(Continued)

*Primary Examiner* — David S Huang
(74) *Attorney, Agent, or Firm* — Fish & Richardson P.C.

(57) ABSTRACT

Example signal transmission methods and apparatus are described. In one example method, a first initiating device sends a poll frame. The poll frame includes time-frequency location information of N first ultra-wideband (UWB) segment signals, and the poll frame further includes first delay information for each of M second responding devices to reply to the first initiating device with a response frame. The first initiating device receives a plurality of response frames based on a timestamp of the poll frame and the first delay information for each of the M second responding devices to reply to the first initiating device with the response frame.

11 Claims, 15 Drawing Sheets

(58) Field of Classification Search
CPC .... G01S 7/006; G01S 13/765; G01S 13/0209; G01S 13/76
See application file for complete search history.

(56) References Cited

U.S. PATENT DOCUMENTS

| | | | | |
|---|---|---|---|---|
| 2020/0182996 | A1 | 6/2020 | Lee et al. | |
| 2022/0137177 | A1* | 5/2022 | Hammerschmidt | G01S 7/006 455/456.1 |

OTHER PUBLICATIONS

Office Action in Japanese Appln. No. 2024-553442, mailed on Sep. 3, 2025, 13 pages (with machine translation).
Extended European Search Report in European Appln. No. 23765841.4, mailed on May 9, 2025, 9 pages.
Ekrem et al., "More on narrowband assisted multi-millisecond UWB," IEEE doc: 15-21-0593-01-04ab-1, Nov. 12, 2021, 9 pages.
Hammerschmidt et al., "Narrowband assisted multi-millisecond UWB," IEEE doc: 15-21-0409-00-04ab, Jul. 20, 2021, 10 pages.
IEEE Std 802.15.4z™-2020, "IEEE Standard for Low-Rate Wireless Networks; Amendment 1: Enhanced Ultra Wideband (UWB) Physical Layers (PHYs) and Associated Ranging Techniques," Jun. 4, 2020, 174 pages.
IEEE Std 802.15.4a™-2007, "IEEE Standard for Information technology-Telecommunications and information exchange between systems-Local and metropolitan area networks—Specific requirements; Part 15.4: Wireless Medium Access Control (MAC) and Physical Layer (PHY) Specifications for Low-Rate Wireless Personal Area Networks (WPANS) Amendment 1: Add Alternate PHYs," Aug. 31, 2007, 203 pages.
International Search Report and Written Opinion in International Appln. No. PCT/CN2023/078875, mailed on May 30, 2023, 13 pages (with English translation).
Kuramochi, "TG4aa JRE Jan. 28, 2021 Teleconference Opening report," IEEE 802. 15-21-0080-00-04aa, Jan. 28, 2021, 17 pages.
IEEE P802.15.4ab/D01, "Draft Standard for Low-Rate Wireless Networks; Amendment 1: Enhanced Ultra Wideband (UWB) Physical Layers (PHYs) and Associated Medium Access and Control (MAC) Sublayer Enhancements," Jun. 2024, 223 pages.
Liu et al., "NBA-MMS-UWB MAC Considerations," IEEE doc:15-21-0605-00-04ab, Nov. 15, 2021, 10 pages.

* cited by examiner

FIG. 8

SIGNAL TRANSMISSION METHOD AND RELATED APPARATUS

CROSS-REFERENCE TO RELATED APPLICATIONS

This application is a continuation of International Application No. PCT/CN2023/078875, filed on Feb. 28, 2023, which claims priority to Chinese Patent Application No. 202210225959.X, filed on Mar. 7, 2022. The disclosures of the aforementioned applications are hereby incorporated by reference in their entireties.

TECHNICAL FIELD

This application relates to the field of communication technologies, and in particular, to a signal transmission method and a related apparatus.

BACKGROUND

An ultra-wideband (ultra-wideband, UWB) technology is a wireless carrier communication technology. In this technology, data transmission is performed by receiving and sending an extremely narrow pulse of a nanosecond or less. Therefore, the UWB technology occupies a wide spectrum range.

For ranging, precision of measurement or sensing is related to a signal bandwidth. A larger signal bandwidth indicates higher precision of sensing or ranging. Therefore, it is proposed that a UWB system is used to perform ranging, to improve the precision of ranging.

Currently, when an initiator uses a UWB system to perform ranging on one responder, the initiator needs to complete ranging on the responder within multiple milliseconds. In this case, if the initiator performs ranging on a plurality of responders by using a process of performing ranging on one responder, the initiator can complete ranging on the plurality of responders only in a long time, resulting in low ranging efficiency of the initiator.

SUMMARY

Embodiments of this application provide a signal transmission method and a related apparatus, to help improve ranging efficiency.

According to a first aspect, an embodiment of this application provides a signal transmission method. In the method, a first initiating device sends a poll frame. The poll frame includes time-frequency location information of N first ultra-wideband UWB segment signals, and first delay information for each of M second responding devices to reply to the first initiating device with a response frame. The first initiating device receives a plurality of response frames based on a timestamp of the poll frame and the first delay information for each second responding device to reply to the first initiating device with the response frame. N and M are integers greater than or equal to 2.

It can be learned that, in this embodiment of this application, the poll frame sent by the first initiating device includes the first delay information for each of the M second responding devices to reply with the response frame, so that some or all of the M second responding devices may reply with response frames at different times determined based on different first delays, to join a ranging round of the first initiating device. Further, this helps the first initiating device perform ranging on a plurality of second responding devices in a short time, and helps improve ranging efficiency.

In an optional implementation, the poll frame further includes second delay information for each second responding device to reply to the first UWB segment signals that are from the first initiating device. In this manner, the first initiating device may further separately send the N first UWB segment signals based on the time-frequency location information of the N first UWB segment signals. The first initiating device separately receives a plurality of second UWB segment signals based on the second delay information for each second responding device to reply to the first UWB segment signals that are from the first initiating device.

It can be learned that the first initiating device starts the ranging round by sending the first UWB segment signal, and the first initiating device may receive, at different times determined based on different second delay information, second UWB segment signals that are replied with by a plurality of second responding devices to all the first UWB segment signals. Therefore, the first initiating device performs ranging on the plurality of second initiating devices based on the plurality of sent first UWB signals and the plurality of received second UWB segment signals.

In another optional implementation, the poll frame further includes a same piece of third delay information for the M second responding devices to reply to the first UWB segment signals that are from the first initiating device, and an orthogonal sequence index of each second responding device. In this manner, the first initiating device may further separately send the N first UWB segment signals based on the time-frequency location information of the N first UWB segment signals. The first initiating device separately receives a plurality of first orthogonal UWB segment signals based on the third delay information and the orthogonal sequence index of each second responding device.

It can be learned that the first initiating device starts the ranging round by sending the first UWB segment signal, and the first initiating device may receive, at a same time determined based on the third delay information, first orthogonal UWB segment signals that are replied with by a plurality of second responding devices to the first UWB segment signals. The plurality of first orthogonal UWB segment signals are orthogonal to each other. This manner also helps the first initiating device perform ranging on the plurality of second initiating devices based on the plurality of sent first UWB signals and the plurality of received first orthogonal UWB segment signals.

In an optional implementation, when the poll frame further includes the same piece of third delay information for the M second responding devices to reply to the first UWB segment signals that are from the first initiating device, and the orthogonal sequence index of each second responding device, the first initiating device is in an active state when sending the N first UWB segment signals and receiving the plurality of first orthogonal UWB segment signals. The first initiating device is in an idle state in interval times of the N first UWB segment signals other than times for sending the N first UWB segment signals and times for receiving the plurality of first orthogonal UWB segment signals.

It can be learned that, in this manner, the first initiating device may be in the active state when sending the N first UWB segment signals and receiving the plurality of first orthogonal UWB segment signals, and may be in the idle state in remaining times in the interval times of the N first UWB segment signals. Therefore, active time of the first initiating device can be reduced, thereby reducing power consumption of the first initiating device.

In still another optional implementation, the poll frame further includes fourth delay information for each second responding device to send a data frame to the first initiating device. In this manner, the first initiating device may further receive a plurality of data frames based on the fourth delay information for each second responding device to send the data frame to the first initiating device. Each of the plurality of data frames includes time difference between receiving, at a first responding device, the N first UWB segment signals and sending, at a first responding device, N second UWB segment signals, or and sending, at a first responding device, N first orthogonal UWB segment signals. The first responding device is any one of the M second responding devices.

It can be learned that the first initiating device may further receive, at different times determined based on the fourth delay information for each second responding device, time difference between receiving and sending UWB segment signal that are reported by a plurality of second responding devices through data frames. Therefore, the first initiating device determines ranging results for the plurality of second responding devices based on time difference between receiving and sending UWB segment signal for the first initiating device and the time difference between receiving and sending UWB segment signal reported by the plurality of second responding devices.

In an optional implementation, that the first initiating device separately sends the N first UWB segment signals based on the time-frequency location information of the N first UWB segment signals includes: When a first timer does not expire and M response frames are received, the first initiating device separately sends the N first UWB segment signals based on the time-frequency location information of the N first UWB segment signals; or when S response frames are received and a first timer expires, the first initiating device separately sends the N first UWB segment signals based on the time-frequency location information of the N first UWB segment signals. The first timer is triggered when the first initiating device sends the poll frame. S is an integer greater than or equal to 1 and less than M.

It can be learned that the first initiating device triggers the first timer when sending the poll frame. If the first initiating device receives response frames replied with by all second responding devices in the M second responding devices, the first initiating device separately sends the N first UWB segment signals; or if the first initiating device receives response frames from some of the M second responding devices and the first timer expires, the first initiating device also separately sends the N first UWB segment signals. To be specific, when not all response frames are received and the first timer expires, the first initiating device no longer continues to wait for a reply from another second responding device to the poll frame, but directly sends the N first UWB segment signals, to start the ranging round. This manner can avoid a ranging failure caused by permanently waiting for a reply to the poll frame by a second responding device by the first initiating device.

According to a second aspect, this application further provides a signal transmission method. The signal transmission method in this aspect corresponds to the signal transmission method in the first aspect. The signal transmission method in this aspect is described from a perspective of a first responding device side. In the method, a first responding device receives a poll frame. The poll frame includes time-frequency location information of N first ultra-wideband UWB segment signals, and first delay information for each of M second responding devices to reply to a first initiating device with a response frame. N and M are integers greater than or equal to 2. The first responding device is any one of the M second responding devices. The first responding device sends a response frame to the first initiating device based on a timestamp of the poll frame and the first delay information for the first responding device to reply to the first initiating device with the response frame.

It can be learned that, in this embodiment of this application, the poll frame received by any second responding device includes the first delay information for the second responding device to reply to the poll frame from the first initiating device, so that any second responding device may reply to the first initiating device with the response frame at a time determined based on the first delay information for the second responding device. Therefore, any second responding device may join a ranging round initiated by the first initiating device, thereby helping the first initiating device perform ranging on a plurality of second responding devices in a short time, that is, helping improve ranging efficiency.

In an optional implementation, the poll frame further includes second delay information for each second responding device to reply to the first UWB segment signals that are from the first initiating device. In this manner, the first responding device may further separately receive the N first UWB segment signals based on the time-frequency location information of the N first UWB segment signals. The first responding device separately sends N second UWB segment signals to the first initiating device based on the second delay information for the first responding device to reply to the first UWB segment signals that are from the first initiating device.

It can be learned that when the poll frame further includes the second delay information for each second responding device to reply to the first UWB segment signals that are from the first initiating device, any second responding device may further separately reply to the first initiating device with N second UWB segment signals based on the second delay information at a different time, so that the first initiating device obtains UWB segment signals used for ranging.

In another optional implementation, the poll frame further includes a same piece of third delay information for the M second responding devices to reply to the first UWB segment signals that are from the first initiating device, and an orthogonal sequence index of each second responding device. In this manner, the first responding device may further separately receive the N first UWB segment signals based on the time-frequency location information of the N first UWB segment signals. The first responding device separately sends N first orthogonal UWB segment signals to the first initiating device based on the third delay information. The first orthogonal UWB segment signals are determined based on the orthogonal sequence index of the first responding device.

It can be learned that any second responding device may reply to the first initiating device with N first orthogonal UWB segment signals at a different time based on the third delay information. Therefore, different second responding devices reply to the first initiating device with different first orthogonal UWB segment signals at same times in interval times of the N first UWB segment signals.

In still another optional implementation, the poll frame further includes fourth delay information for each second responding device to send a data frame to the first initiating device. In this manner, the first responding device may further send the data frame to the first initiating device based on the fourth delay information for the first responding device to send the data frame to the first initiating device. The data frame includes time difference between receiving, at a first responding device, the N first UWB segment signals and sending, at a first responding device, N second UWB segment signals, or and sending, at a first responding device, N first orthogonal UWB segment signals.

It can be learned that any second responding device may further report, at a time determined based on the fourth delay information, time difference between receiving and sending UWB segment signal to the first initiating device. Therefore, different second responding devices may send data frames to the first initiating device at different times determined based on different fourth delay information, to help the first initiating device perform ranging on a plurality of second responding devices based on time difference between receiving and sending UWB segment signal for the first initiating device and time difference between receiving and sending UWB segment signal reported by the plurality of second responding devices.

According to a third aspect, this application further provides a signal transmission method. In the method, a first initiating device sends a poll frame. The poll frame includes time-frequency location information of N first ultra-wideband UWB segment signals, a same response time at which M second responding devices reply to the first initiating device with a response frame, and subcarrier sets for all of the M second responding devices to reply to the first initiating device with the response frame. A narrowband signal transmitted at the response time includes a plurality of subcarriers. N and M are integers greater than or equal to 2. The first initiating device receives the response frame based on the response time and the subcarrier sets for all the second responding devices to reply to the first initiating device with the response frame, where the response frame includes a plurality of response signals.

It can be learned that, in this embodiment of this application, the poll frame sent by the first initiating device includes the same response time at which the M second responding devices reply to the first initiating device with the response frame, and the subcarrier sets for all of the M second responding devices to reply to the first initiating device with the response frame. Therefore, some or all of the M second responding devices may reply to the first initiating device with response signals on different subcarrier sets at the response time. Further, some or all of the M second responding devices may join a ranging round of the first initiating device, thereby helping the first initiating device perform ranging on a plurality of second responding devices in a short time, and helping improve ranging efficiency.

In an optional implementation, the poll frame further includes second delay information for each second responding device to reply to the first UWB segment signals that are from the first initiating device. In this manner, the first initiating device may further separately send the N first UWB segment signals based on the time-frequency location information of the N first UWB segment signals. The first initiating device separately receives a plurality of second UWB segment signals based on the second delay information for each second responding device to reply to the first UWB segment signals that are from the first initiating device.

It can be learned that the first initiating device starts the ranging round by sending the first UWB segment signal, and the first initiating device may receive, at different times determined based on different second delay information, second UWB segment signals that are replied with by a plurality of second responding devices to all the first UWB segment signals. Therefore, the first initiating device performs ranging on the plurality of second initiating devices based on the plurality of sent first UWB signals and the plurality of received second UWB segment signals.

In another optional implementation, the poll frame further includes a same piece of third delay information for the M second responding devices to reply to the first UWB segment signals that are from the first initiating device, and an orthogonal sequence index of each second responding device. In this manner, the first initiating device may further separately send the N first UWB segment signals based on the time-frequency location information of the N first UWB segment signals. The first initiating device separately receives a plurality of first orthogonal UWB segment signals based on the third delay information and the orthogonal sequence index of each second responding device.

It can be learned that the first initiating device starts the ranging round by sending the first UWB segment signal, and the first initiating device may receive, at a same time determined based on the third delay information, first orthogonal UWB segment signals that are replied with by a plurality of second responding devices to the first UWB segment signals. The plurality of first orthogonal UWB segment signals are orthogonal to each other. This manner also helps the first initiating device perform ranging on the plurality of second initiating devices based on the plurality of sent first UWB signals and the plurality of received first orthogonal UWB segment signals.

In an optional implementation, when the poll frame further includes the same piece of third delay information for the M second responding devices to reply to the first UWB segment signals that are from the first initiating device, and the orthogonal sequence index of each second responding device, the first initiating device is in an active state when sending the N first UWB segment signals and receiving the plurality of first orthogonal UWB segment signals, and is in an idle state in interval times of the N first UWB segment signals other than times for sending the N first UWB segment signals and times for receiving the plurality of first orthogonal UWB segment signals.

It can be learned that, in this manner, the first initiating device may be in the active state when sending the N first UWB segment signals and receiving the plurality of first orthogonal UWB segment signals, and may be in the idle state in remaining times in the interval times of the N first UWB segment signals. Therefore, active time of the first initiating device can be reduced, thereby reducing power consumption of the first initiating device.

In still another optional implementation, the poll frame further includes a same data frame time at which all the second responding devices send a data frame to the first initiating device, and subcarrier sets for all the second responding devices to send the data frame to the first initiating device. In this manner, the first initiating device may further receive the data frame based on the data frame time and the subcarrier sets for all the second responding devices to send the data frame to the first initiating device. The data frame includes a plurality of data signals. Each of the plurality of data signals includes time difference between receiving, at a first responding device, the N first UWB segment signals and sending, at a first responding device, N second UWB segment signals, or and sending, at a first responding device, N first orthogonal UWB segment signals. The first responding device is any one of the M second responding devices.

It can be learned that the first initiating device may further receive, at different times determined based on fourth delay information for each second responding device, time difference between receiving and sending UWB segment signal that are reported by a plurality of second responding devices through data frames. This manner helps the first initiating device determine ranging results for the plurality of second responding devices based on time difference between receiving and sending UWB segment signal for the first initiating device and the receiving and sending times reported by the plurality of second responding devices.

According to a fourth aspect, this application further provides a signal transmission method. The signal transmission method in this aspect corresponds to the signal transmission method in the third aspect. The signal transmission method in this aspect is described from a perspective of a first responding device side. In the method, a first responding device receives a poll frame. The poll frame includes time-frequency location information of N first ultra-wideband UWB segment signals, a same response time at which M second responding devices reply to a first initiating device with a response frame, and subcarrier sets for all first responding devices in the M second responding devices to reply to the first initiating device with the response frame, where a narrowband signal transmitted at the response time includes a plurality of subcarriers, and N and M are integers greater than or equal to 2. The first responding device sends a response signal to the first initiating device based on the response time and a subcarrier set for the first responding device to reply to the first initiating device with the response frame. The first responding device is any one of the M second responding devices.

It can be learned that, in this embodiment of this application, any second responding device may reply to the first initiator with the response frame on the subcarrier set for the second responding device at the response time. In this manner, any second responding device may join a ranging round of the first initiating device, thereby helping the first initiating device implement ranging on a plurality of second responding devices, and improving ranging efficiency.

In an optional implementation, the poll frame further includes second delay information for each second responding device to reply to the first UWB segment signals that are from the first initiating device. In this manner, the first responding device may further separately receive the N first UWB segment signals based on the time-frequency location information of the N first UWB segment signals. The first responding device separately sends N second UWB segment signals to the first initiating device based on the second delay information for the first responding device to reply to the first UWB segment signals that are from the first initiating device.

It can be learned that when the poll frame further includes the second delay information for each second responding device to reply to the first UWB segment signals that are from the first initiating device, any second responding device may further separately reply to the first initiating device with N second UWB segment signals based on the second delay information at a different time, so that the first initiating device obtains UWB segment signals used for ranging. In another optional implementation, the poll frame further includes a same piece of third delay information for the M second responding devices to reply to the first UWB segment signals that are from the first initiating device, and an orthogonal sequence index of each second responding device. In this manner, the first responding device may further separately receive the N first UWB segment signals based on the time-frequency location information of the N first UWB segment signals. The first responding device separately sends N first orthogonal UWB segment signals to the first initiating device based on the third delay information. The first orthogonal UWB segment signals are determined based on the orthogonal sequence index of the first responding device.

It can be learned that any second responding device may reply to the first initiating device with N first orthogonal UWB segment signals at a different time based on the third delay information. Therefore, different second responding devices reply to the first initiating device with different first orthogonal UWB segment signals at same times in interval times of the N first UWB segment signals.

In an optional implementation, the poll frame further includes a same data frame time at which all the second responding devices send a data frame to the first initiating device, and subcarrier sets for all the second responding devices to send the data frame to the first initiating device. In this manner, the first responding device may further send a data signal to the first initiating device based on the data frame time and the subcarrier set for the first responding device to send the data frame to the first initiating device. The data signal includes time difference between receiving, at a first responding device, the N first UWB segment signals and sending, at a first responding device, N second UWB segment signals, or and sending, at a first responding device, N first orthogonal UWB segment signals.

It can be learned that any second responding device may further report, at a time determined based on fourth delay information, time difference between receiving and sending UWB segment signal to the first initiating device. Therefore, different second responding devices may send data frames to the first initiating device at different times determined based on different fourth delay information, to help the first initiating device perform ranging on a plurality of second responding devices based on time difference between receiving and sending UWB segment signal for the first initiating device and time difference between receiving and sending UWB segment signal reported by the plurality of second responding devices.

According to a fifth aspect, this application further provides a signal transmission method. In the method, a control device sends a poll frame, where the poll frame includes time-frequency location information of N ultra-wideband UWB segment signal groups, first delay information for each of M second responding devices to reply to the control device with a response frame, and fifth delay information for each of X second initiating devices to reply to the control device with a response frame. N, M, and X are integers greater than or equal to 2. The control device receives a plurality of response frames based on multiple pieces of first delay information, multiple pieces of fifth delay information, and a timestamp of the poll frame.

It can be learned that, in this embodiment of this application, the control device sends the poll frame, and configures, through the poll frame, the fifth delay information for each of the X second initiating devices to reply to the control device with the response frame and the first delay information for each of the M second responding devices to reply to the control device with the response frame, so that some or all of the X second initiating devices can reply to the control device with response frames at different times, and some or all of the M second responding devices can reply to the control device with response frames at different times. Therefore, a plurality of second initiating devices that reply with the response frames and a plurality of second responding devices that reply with the response frames join the same ranging round, thereby helping implement ranging performed by the plurality of second initiating devices on the plurality of second responding devices, that is, helping improve ranging efficiency.

In an optional implementation, the poll frame further includes an orthogonal sequence index of each second initiating device, an orthogonal sequence index of each of the M second responding devices, and a same piece of third delay information for all second responding devices to reply to a first initiating device with third orthogonal UWB segment signals.

In this manner, any second initiating device may separately send N second orthogonal UWB segment signals based on the time-frequency location information of the N UWB segment signal groups and the orthogonal sequence index of the second initiating device. Therefore, any second responding device separately receives a plurality of second orthogonal UWB segment signals based on the time-frequency location information of the N UWB segment signal groups and the orthogonal sequence index of each second initiating device. In addition, any second responding device may send N third orthogonal UWB segment signals based on the third delay information and the orthogonal sequence index of the second responding device. Therefore, any second initiating device may receive a plurality of third orthogonal UWB segment signals based on the third delay information and the orthogonal sequence index of each second responding device.

In another optional implementation, the poll frame further includes fourth delay information for each second responding device to send a data frame to a second initiating device, so that any second responding device may send a data frame based on the fourth delay information for the second responding device. The data frame includes times at which the second responding device receives second orthogonal UWB segment signals and times at which the second responding device sends third orthogonal UWB segment signals. Correspondingly, any first initiating device that joins the ranging round may receive a plurality of data frames based on the fourth delay information for each second responding device, and further perform ranging on a plurality of second responding devices based on time information carried in the data frames.

According to a sixth aspect, this application further provides a signal transmission method. The signal transmission method in this aspect corresponds to the signal transmission method in the fifth aspect. The signal transmission method in this aspect is described from a perspective of a first initiating device side. In the method, a first initiating device receives a poll frame, where the poll frame includes time-frequency location information of N ultra-wideband UWB segment signal groups, and fifth delay information for each of X second initiating devices to reply to a control device with a response frame, where the first initiating device is any one of the X second initiating devices, and N and X are integers greater than or equal to 2. The first initiating device sends a response frame to the control device based on a timestamp of the poll frame and the fifth delay information for the first initiating device to reply to the control device with the response frame.

It can be learned that, in this embodiment of this application, the poll frame received by any second initiating device includes the fifth delay information for the initiating device to reply to the control device with the response frame, so that any second initiating device can reply to the control device with the response frame based on the fifth delay information. Therefore, any second initiating device can join a ranging round, so that a plurality of initiating devices can join a same ranging round, thereby helping improve ranging efficiency.

In an optional implementation, the poll frame further includes an orthogonal sequence index of each second initiating device, an orthogonal sequence index of each of M second responding devices, and a same piece of third delay information for all second responding devices to reply to first UWB segment signals that are from the first initiating device. M is an integer greater than or equal to 2. In this manner, the first initiating device may further separately send N second orthogonal UWB segment signals based on the time-frequency location information of the N UWB segment signal groups and the orthogonal sequence index of the first initiating device. The first initiating device separately receives a plurality of third orthogonal UWB segment signals based on the third delay information and the orthogonal sequence index of each second responding device.

It can be learned that any second initiating device may further separately send N second orthogonal UWB segment signals based on the orthogonal sequence index of the second initiating device and the time-frequency location information of the N UWB segment signal groups, and separately receive a plurality of third orthogonal UWB segment signals based on the third delay information and the orthogonal sequence index of each second responding device. To be specific, any second initiating device may perform ranging by sending second orthogonal UWB segment signals and receiving third orthogonal UWB segment signals.

In another optional implementation, the poll frame further includes fourth delay information for each second responding device to send a data frame to a second initiating device. In this manner, the first initiating device may further receive a plurality of data frames based on the fourth delay information for each second responding device to send the data frame to the second initiating device. Each of the plurality of data frames includes times at which a first responding device receives a plurality of second orthogonal UWB segment signals and times at which the first responding device sends a plurality of third orthogonal UWB segment signals. The first responding device is any one of the M second responding devices.

It can be learned that any second initiating device may further separately receive, based on the fourth delay information for each responding device, orthogonal UWB segment signal receiving and sending times reported by a plurality of second responding devices, so that each second initiating device may perform, based on the orthogonal UWB segment signal receiving and sending times, ranging on the plurality of second responding devices that report the receiving and sending times.

According to a seventh aspect, this application further provides a signal transmission method. The signal transmission method in this aspect corresponds to the signal transmission methods in the fifth aspect and the sixth aspect. The signal transmission method in this aspect is described from a perspective of a first responding device side. In the method, a first responding device receives a poll frame, where the poll frame includes time-frequency location information of N ultra-wideband UWB segment signal groups, and first delay information for each of M second responding devices to reply to a control device with a response frame. The first responding device is any one of the M second responding devices. N and M are integers greater than or equal to 2. The first responding device sends a response frame to the control device based on a timestamp of the poll frame and the first delay information for the first responding device to reply to the control device with the response frame.

It can be learned that, in this embodiment of this application, the poll frame received by any second responding device includes the first delay information for the second responding device to reply to the control device with the response frame, so that any second responding device may reply to the control device with the response frame at a different time, thereby helping a plurality of second responding devices join a same ranging round, and helping improve ranging efficiency.

In an optional implementation, the poll frame further includes an orthogonal sequence index of each of X second initiating devices, an orthogonal sequence index of each second responding device, and a same piece of third delay information for all second responding devices to reply to first UWB segment signals from a first initiating device. X is an integer greater than or equal to 2. In this manner, a second responding device may further separately receive a plurality of second orthogonal UWB segment signals based on the time-frequency location information of the N UWB segment signal groups and the orthogonal sequence indexes of the X second initiating devices. The first responding device separately sends a plurality of third orthogonal UWB segment signals based on the third delay information and the orthogonal sequence index of the first responding device.

In an optional implementation, the poll frame further includes fourth delay information for each second responding device to send a data frame to a second initiating device. In this manner, the first responding device may further send a data frame based on the fourth delay information for the first responding device to send the data frame to the second initiating device. The data frame includes times at which the first responding device receives the plurality of second orthogonal UWB segment signals and times at which the first responding device sends the plurality of third orthogonal UWB segment signals.

According to an eighth aspect, this application further provides a signal transmission method. In the method, a control device sends a poll frame, where the poll frame includes time-frequency location information of N ultra-wideband UWB segment signal groups, a first response time at which X second initiating devices reply to the control device with a response frame, subcarrier sets for all of the X second initiating devices to reply to the control device with the response frame, a second response time at which M second responding devices reply to the control device with a response frame, and the subcarrier sets for all of the M second responding devices to reply to the control device with the response frame. N, M, and X are integers greater than or equal to 2. The control device receives a second response frame based on the same second response time at which the M second responding devices reply to the control device with the response frame and the subcarrier sets for all the second responding devices to reply to the control device with the response frame, where the second response frame includes a plurality of second response signals. The control device receives a first response frame based on the same first response time at which the X second initiating devices reply to the control device with the response frame and the subcarrier sets for all the second initiating devices to reply to the control device with the response frame, where the first response frame includes a plurality of first response signals.

It can be learned that, in this embodiment of this application, the control device sends the poll frame, and configures, through the poll frame, the first response time at which the X second initiating devices reply to the control device with the response frame and the subcarrier sets for all of the X second initiating devices to reply to the control device with the response frame, and the second response time at which the M second responding devices reply to the control device with the response frame and the subcarrier sets for all of the M second responding devices to reply to the control device with the response frame. In this manner, a plurality of second initiating devices in the X second initiating devices may reply to the control device with first response signals at the first response time, and a plurality of second responding devices in the M second responding devices may reply to the control device with second response signals at the second response time. The first response signals replied with by the plurality of second initiating devices are orthogonal to each other, and the second response signals replied with by the plurality of second responding devices are orthogonal to each other. Therefore, a plurality of second initiating devices that reply with response frames and a plurality of second responding devices that reply with response frames may join a same ranging round, thereby helping implement ranging performed by the plurality of second initiating devices on the plurality of second responding devices, that is, helping improve ranging efficiency.

In an optional implementation, the poll frame further includes an orthogonal sequence index of each second initiating device, an orthogonal sequence index of each of the M second responding devices, and a same piece of third delay information for all second responding devices to reply to first UWB segment signals from a first initiating device.

In another optional implementation, the poll frame further includes a data frame time at which the M second responding devices send a data frame to a second initiating device, and subcarrier sets for all of the M second responding devices to send the data frame to the second initiating device. In this manner, different second responding devices may send data signals to the second initiating device on different subcarrier sets at the same data frame time, where a plurality of data signals from the data frame. Each data signal includes time difference between receiving and sending UWB segment signal for a first responding device, so that any second initiating device can perform ranging on a plurality of second responding devices based on times carried in each data signal.

According to a ninth aspect, this application further provides a signal transmission method. The signal transmission method in this aspect corresponds to the signal transmission method in the eighth aspect. The signal transmission method in this aspect is described from a perspective of a first initiating device side. In the method, a first initiating device receives a poll frame, where the poll frame includes time-frequency location information of N ultra-wideband UWB segment signal groups, a same first response time at which X second initiating devices reply to a control device with a response frame, and subcarrier sets for all of the X second initiating devices to reply to the control device with the response frame, where the first initiating device is any one of the X second initiating devices. N and X are integers greater than or equal to 2. The first initiating device sends a first response signal based on the first response time and the subcarrier set for the first initiating device to reply to the control device with the response frame.

It can be learned that, in this embodiment of this application, the poll frame received by any second initiating device includes a time at which the second initiating device replies to the control device with a first response signal and the subcarrier set, so that a plurality of second initiating devices may join a same ranging round, thereby helping implement ranging on the plurality of second initiating devices, and helping improve ranging efficiency.

In an optional implementation, the poll frame further includes an orthogonal sequence index of each second initiating device, an orthogonal sequence index of each of M second responding devices, and a same piece of third delay information for all second responding devices to reply to first UWB segment signals from a second initiating device, where M is an integer greater than or equal to 2. In this manner, the first initiating device may further separately send N second orthogonal UWB segment signals based on the time-frequency location information of the N first UWB segment signal groups and the orthogonal sequence index of the first initiating device. The first initiating device separately receives a plurality of third orthogonal UWB segment signals based on the third delay information and the orthogonal sequence index of each second responding device.

In an optional implementation, the poll frame further includes a same data frame time at which all the second responding devices send a data frame to the first initiating device, and subcarrier sets for all the second responding devices to send the data frame to the first initiating device. In this manner, the first initiating device may further receive the data frame based on the data frame time and the subcarrier sets for all the second responding devices to send the data frame to the first initiating device. The data frame includes a plurality of data signals, and each of the plurality of data signals includes times at which a first responding device receives a plurality of second orthogonal UWB segment signals and times at which the first responding device sends a plurality of third orthogonal UWB segment signals. The first responding device is any one of the M second responding devices.

According to a tenth aspect, this application further provides a signal transmission method. The signal transmission method in this aspect corresponds to the signal transmission methods in the eighth aspect and the ninth aspect. The signal transmission method in this aspect is described from a perspective of a first responding device side. In the method, a first responding device receives a poll frame, where the poll frame includes time-frequency location information of N ultra-wideband UWB segment signal groups, a same second response time at which M second responding devices reply to a control device with a response frame, and subcarrier sets for all of the M second responding devices to reply to the control device with the response frame. N and M are integers greater than or equal to 2. The first responding device is any one of the M second responding devices. The first responding device sends a second response signal based on the second response time and the subcarrier set for the first responding device to reply to the control device with the response frame.

It can be learned that, in this embodiment of this application, the poll frame received by any second responding device includes a time at which the second responding device replies to the control device with a second response signal and the subcarrier set, so that a plurality of second responding devices may join a same ranging round, thereby helping implement ranging on the plurality of second responding devices, and helping improve ranging efficiency.

In an optional implementation, the poll frame further includes an orthogonal sequence index of each of X second initiating devices, an orthogonal sequence index of each second responding device, and a same piece of third delay information for all second responding devices to reply to first UWB segment signals from a first initiating device. The first initiating device is any one of the X second initiating devices, and X is an integer greater than or equal to 2. In this manner, the first responding device may further receive a plurality of second orthogonal UWB segment signals based on the time-frequency location information of the N UWB segment signal groups and the orthogonal sequence index of each second initiating device. The first responding device separately sends a plurality of third orthogonal UWB segment signals based on the third delay information and the orthogonal sequence index of the first responding device.

In another optional implementation, the poll frame further includes a same data frame time at which all the second responding devices send a data frame to the first initiating device, and subcarrier sets for all the second responding devices to send the data frame to the first initiating device. In this manner, the first responding device may further send a data signal based on the data frame time and the subcarrier set for the first responding device to send the data frame to the first initiating device, where the data signal includes times at which the first responding device receives the plurality of second orthogonal UWB segment signals and times at which the first responding device sends the plurality of third orthogonal UWB segment signals.

According to an eleventh aspect, this application further provides a communication apparatus. The communication apparatus has some or all of functions of implementing the first initiating device according to the first aspect, the third aspect, the sixth aspect, and the ninth aspect, or has some or all of functions of implementing the first responding device according to the second aspect, the fourth aspect, the seventh aspect, and the tenth aspect, or has some or all of functions of implementing the control device according to the fifth aspect or the eighth aspect. For example, a function of the communication apparatus may include a function in some or all of the embodiments of the first initiating device according to the first aspect of this application, or may have a function of independently implementing any one of embodiments of this application. The function may be implemented by using hardware, or may be implemented by using hardware executing corresponding software. The hardware or the software includes one or more units or modules corresponding to the foregoing functions.

In a possible design, a structure of the communication apparatus may include a processing unit and a communication unit. The processing unit is configured to support the communication apparatus in performing a corresponding function in the foregoing methods. The communication unit is configured to support communication between the communication apparatus and another communication apparatus. The communication apparatus may further include a storage unit. The storage unit is configured to be coupled to the processing unit and the communication unit, and stores program instructions and data that are necessary for the communication apparatus.

In an implementation, the communication apparatus includes the processing unit and the communication unit. The processing unit is configured to control the communication unit to perform data/signaling receiving and sending. The communication unit is configured to send a poll frame. The poll frame includes time-frequency location information of N first ultra-wideband UWB segment signals, and first delay information for each of M second responding devices to reply to a first initiating device with a response frame, where N and M are integers greater than or equal to 2. The communication unit is further configured to receive a plurality of response frames based on a timestamp of the poll frame and the first delay information for each second responding device to reply to the first initiating device with the response frame.

In addition, for another optional implementation of the communication apparatus in this aspect, refer to related content of the first aspect. Details are not described herein again.

In another implementation, the communication apparatus includes the processing unit and the communication unit. The processing unit is configured to control the communication unit to perform data/signaling receiving and sending. The communication unit is configured to receive a poll frame. The poll frame includes time-frequency location information of N first ultra-wideband UWB segment signals, and first delay information for each of M second responding devices to reply to a first initiating device with a response frame, where N and M are integers greater than or equal to 2, and a first responding device is any one of the M second responding devices. The communication unit is further configured to send a response frame to the first initiating device based on a timestamp of the poll frame and the first delay information for the first responding device to reply to the first initiating device with the response frame.

In addition, for another optional implementation of the communication apparatus in this aspect, refer to related content of the second aspect. Details are not described herein again.

In still another implementation, the communication apparatus includes the processing unit and the communication unit. The processing unit is configured to control the communication unit to perform data/signaling receiving and sending. The communication unit is configured to send a poll frame. The poll frame includes time-frequency location information of N first ultra-wideband UWB segment signals, a same response time at which M second responding devices reply to a first initiating device with a response frame, and subcarrier sets for all of the M second responding devices to reply to the first initiating device with the response frame, where a narrowband signal transmitted at the response time includes a plurality of subcarriers, and N and M are integers greater than or equal to 2. The communication unit is further configured to receive the response frame based on the response time and the subcarrier sets for all the second responding devices to reply to the first initiating device with the response frame, where the response frame includes a plurality of response signals.

In addition, for another optional implementation of the communication apparatus in this aspect, refer to related content of the third aspect. Details are not described herein again.

In still another implementation, the communication apparatus includes the processing unit and the communication unit. The processing unit is configured to control the communication unit to perform data/signaling receiving and sending. The communication unit is configured to receive a poll frame. The poll frame includes time-frequency location information of N first ultra-wideband UWB segment signals, a same response time at which M second responding devices reply to a first initiating device with a response frame, and subcarrier sets for all first responding devices in the M second responding devices to reply to the first initiating device with the response frame, where a narrowband signal transmitted at the response time includes a plurality of subcarriers, and N and M are integers greater than or equal to 2. The communication unit is further configured to send a response signal to the first initiating device based on the response time and a subcarrier set for a first responding device to reply to the first initiating device with the response frame, where the first responding device is any one of the M second responding devices.

In addition, for another optional implementation of the communication apparatus in this aspect, refer to related content of the fourth aspect. Details are not described herein again.

In still another implementation, the communication apparatus includes the processing unit and the communication unit. The processing unit is configured to control the communication unit to perform data/signaling receiving and sending. The communication unit sends a poll frame. The poll frame includes time-frequency location information of N ultra-wideband UWB segment signal groups, first delay information for each of M second responding devices to reply to a control device with a response frame, and fifth delay information for each of X second initiating devices to reply to the control device with a response frame, where N, M, and X are integers greater than or equal to 2. The communication unit is further configured to receive a plurality of response frames based on multiple pieces of first delay information, multiple pieces of fifth delay information, and a timestamp of the poll frame.

In addition, for another optional implementation of the communication apparatus in this aspect, refer to related content of the fifth aspect. Details are not described herein again.

In still another implementation, the communication apparatus includes the processing unit and the communication unit. The processing unit is configured to control the communication unit to perform data/signaling receiving and sending. The communication unit is configured to receive a poll frame. The poll frame includes time-frequency location information of N ultra-wideband UWB segment signal groups, and fifth delay information for each of X second initiating devices to reply to a control device with a response frame, where a first initiating device is any one of the X second initiating devices, and N and X are integers greater than or equal to 2. The communication unit is further configured to send a response frame to the control device based on a timestamp of the poll frame and the fifth delay information for the first initiating device to reply to the control device with the response frame.

In addition, for another optional implementation of the communication apparatus in this aspect, refer to related content of the sixth aspect. Details are not described herein again.

In still another implementation, the communication apparatus includes the processing unit and the communication unit. The processing unit is configured to control the communication unit to perform data/signaling receiving and sending. The communication unit is configured to receive a poll frame. The poll frame includes time-frequency location information of N ultra-wideband UWB segment signal groups, and first delay information for each of M second responding devices to reply to a control device with a response frame, where a first responding device is any one of the M second responding devices, and N and M are integers greater than or equal to 2. The communication unit is further configured to send a response frame to the control device based on a timestamp of the poll frame and the first delay information for the first responding device to reply to the control device with the response frame.

In addition, for another optional implementation of the communication apparatus in this aspect, refer to related content of the seventh aspect. Details are not described herein again.

In still another implementation, the communication apparatus includes the processing unit and the communication unit. The processing unit is configured to control the communication unit to perform data/signaling receiving and sending. The communication unit is configured to send a poll frame. The poll frame includes time-frequency location information of N ultra-wideband UWB segment signal groups, a same second response time at which M second responding devices reply to a control device with a response frame, subcarrier sets for all of the M second responding devices to reply to the control device with the response frame, a same first response time at which X second initiating devices reply to the control device with a response frame, and subcarrier sets for all of the X second initiating devices to reply to the control device with the response frame, where a narrowband signal transmitted at the response time includes a plurality of subcarriers, and N, M, and X are integers greater than or equal to 2.

The communication unit is further configured to receive a second response frame based on the same second response time at which the M second responding devices reply to the control device with the response frame and the subcarrier sets for all the second responding devices to reply to the control device with the response frame, where the second response frame includes a plurality of second response signals. The communication unit is further configured to receive a first response frame based on the same first response time at which the X second initiating devices reply to the control device with the response frame and the subcarrier sets for all the second initiating devices to reply to the control device with the response frame, where the first response frame includes a plurality of first response signals.

In addition, for another optional implementation of the communication apparatus in this aspect, refer to related content of the eighth aspect. Details are not described herein again.

In still another implementation, the communication apparatus includes the processing unit and the communication unit. The processing unit is configured to control the communication unit to perform data/signaling receiving and sending. The communication unit is configured to receive a poll frame. The poll frame includes time-frequency location information of N ultra-wideband UWB segment signal groups, a same first response time at which X second initiating devices reply to a control device with a response frame, and subcarrier sets for all of the X second initiating devices to reply to the control device with the response frame, where a first initiating device is any one of the X second initiating devices, and N and X are integers greater than or equal to 2.

The communication unit is further configured to send a first response signal based on the first response time and the subcarrier set for the first initiating device to reply to the control device with the response frame.

In addition, for another optional implementation of the communication apparatus in this aspect, refer to related content of the ninth aspect. Details are not described herein again.

In still another implementation, the communication apparatus includes the processing unit and the communication unit. The processing unit is configured to control the communication unit to perform data/signaling receiving and sending. The communication unit is configured to receive a poll frame. The poll frame includes time-frequency location information of N ultra-wideband UWB segment signal groups, a same second response time at which M second responding devices reply to a control device with a response frame, and subcarrier sets for all of the M second responding devices to reply to the control device with the response frame, where N and M are integers greater than or equal to 2, and a first responding device is any one of the M second responding devices. The communication unit is further configured to send a second response signal based on the second response time and the subcarrier set for the first responding device to reply to the control device with the response frame.

In addition, for another optional implementation of the communication apparatus in this aspect, refer to related content of the tenth aspect. Details are not described herein again.

In an example, the communication unit may be a transceiver or a communication interface, the storage unit may be a memory, and the processing unit may be a processor.

In an implementation, the communication apparatus includes the processor and the transceiver. The processor is configured to control the transceiver to perform data/signaling receiving and sending. The transceiver is configured to send a poll frame. The poll frame includes time-frequency location information of N first ultra-wideband UWB segment signals, and first delay information for each of M second responding devices to reply to a first initiating device with a response frame, where N and M are integers greater than or equal to 2. The transceiver is further configured to receive a plurality of response frames based on a timestamp of the poll frame and the first delay information for each second responding device to reply to the first initiating device with the response frame.

In addition, for another optional implementation of the communication apparatus in this aspect, refer to related content of the first aspect. Details are not described herein again.

In another implementation, the communication apparatus includes the processor and the transceiver. The processor is configured to control the transceiver to perform data/signaling receiving and sending. The transceiver receives a poll frame. The poll frame includes time-frequency location information of N first ultra-wideband UWB segment signals, and first delay information for each of M second responding devices to reply to a first initiating device with a response frame, where N and M are integers greater than or equal to 2, and a first responding device is any one of the M second responding devices. The transceiver is further configured to send a response frame to the first initiating device based on a timestamp of the poll frame and the first delay information for the first responding device to reply to the first initiating device with the response frame.

In addition, for another optional implementation of the communication apparatus in this aspect, refer to related content of the second aspect. Details are not described herein again.

In still another implementation, the communication apparatus includes the processor and the transceiver. The processor is configured to control the transceiver to perform data/signaling receiving and sending. The transceiver is configured to send a poll frame. The poll frame includes time-frequency location information of N first ultra-wideband UWB segment signals, a same response time at which M second responding devices reply to a first initiating device with a response frame, and subcarrier sets for all of the M second responding devices to reply to the first initiating device with the response frame, where a narrowband signal transmitted at the response time includes a plurality of subcarriers, and N and M are integers greater than or equal to 2. The transceiver is further configured to receive the response frame based on the response time and the subcarrier sets for all the second responding devices to reply to the first initiating device with the response frame, where the response frame includes a plurality of response signals.

In addition, for another optional implementation of the communication apparatus in this aspect, refer to related content of the third aspect. Details are not described herein again.

In still another implementation, the communication apparatus includes the processor and the transceiver. The processor is configured to control the transceiver to perform data/signaling receiving and sending. The transceiver is configured to receive a poll frame. The poll frame includes time-frequency location information of N first ultra-wideband UWB segment signals, a same response time at which M second responding devices reply to a first initiating device with a response frame, and subcarrier sets for all first responding devices in the M second responding devices to reply to the first initiating device with the response frame, where a narrowband signal transmitted at the response time includes a plurality of subcarriers, and N and M are integers greater than or equal to 2. The transceiver is further configured to send a response signal to the first initiating device based on the response time and a subcarrier set for a first responding device to reply to the first initiating device with the response frame, where the first responding device is any one of the M second responding devices.

In addition, for another optional implementation of the communication apparatus in this aspect, refer to related content of the fourth aspect. Details are not described herein again.

In still another implementation, the communication apparatus includes the processor and the transceiver. The processor is configured to control the transceiver to perform data/signaling receiving and sending. The transceiver is configured to send a poll frame. The poll frame includes time-frequency location information of N ultra-wideband UWB segment signal groups, first delay information for each of M second responding devices to reply to a control device with a response frame, and fifth delay information for each of X second initiating devices to reply to the control device with a response frame, where N, M, and X are integers greater than or equal to 2. The transceiver is further configured to receive a plurality of response frames based on multiple pieces of first delay information, multiple pieces of fifth delay information, and a timestamp of the poll frame.

In addition, for another optional implementation of the communication apparatus in this aspect, refer to related content of the fifth aspect. Details are not described herein again.

In still another implementation, the communication apparatus includes the processor and the transceiver. The processor is configured to control the transceiver to perform data/signaling receiving and sending. The transceiver is configured to receive a poll frame. The poll frame includes time-frequency location information of N ultra-wideband UWB segment signal groups, and fifth delay information for each of X second initiating devices to reply to a control device with a response frame, where a first initiating device is any one of the X second initiating devices, and N and X are integers greater than or equal to 2. The transceiver is further configured to send a response frame to the control device based on a timestamp of the poll frame and the fifth delay information for the first initiating device to reply to the control device with the response frame.

In addition, for another optional implementation of the communication apparatus in this aspect, refer to related content of the sixth aspect. Details are not described herein again.

In still another implementation, the communication apparatus includes the processor and the transceiver. The processor is configured to control the transceiver to perform data/signaling receiving and sending. The transceiver is configured to receive a poll frame. The poll frame includes time-frequency location information of N ultra-wideband UWB segment signal groups, and first delay information for each of M second responding devices to reply to a control device with a response frame, where a first responding device is any one of the M second responding devices, and N and M are integers greater than or equal to 2. The transceiver is further configured to send a response frame to the control device based on a timestamp of the poll frame and the first delay information for the first responding device to reply to the control device with the response frame.

In addition, for another optional implementation of the communication apparatus in this aspect, refer to related content of the seventh aspect. Details are not described herein again.

In still another implementation, the communication apparatus includes the processor and the transceiver. The processor is configured to control the transceiver to perform data/signaling receiving and sending. The transceiver is configured to send a poll frame. The poll frame includes time-frequency location information of N ultra-wideband UWB segment signal groups, a same second response time at which M second responding devices reply to a control device with a response frame, subcarrier sets for all of the M second responding devices to reply to the control device with the response frame, a same first response time at which X second initiating devices reply to the control device with a response frame, and subcarrier sets for all of the X second initiating devices to reply to the control device with the response frame, where a narrowband signal transmitted at the response time includes a plurality of subcarriers, and N, M, and X are integers greater than or equal to 2.

The transceiver is further configured to receive a second response frame based on the same second response time at which the M second responding devices reply to the control device with the response frame and the subcarrier sets for all the second responding devices to reply to the control device with the response frame, where the second response frame includes a plurality of second response signals. The transceiver is further configured to receive a first response frame based on the same first response time at which the X second initiating devices reply to the control device with the response frame and the subcarrier sets for all the second initiating devices to reply to the control device with the response frame, where the first response frame includes a plurality of first response signals.

In addition, for another optional implementation of the communication apparatus in this aspect, refer to related content of the eighth aspect. Details are not described herein again.

In still another implementation, the communication apparatus includes the processor and the transceiver. The processor is configured to control the transceiver to perform data/signaling receiving and sending. The transceiver is configured to receive a poll frame. The poll frame includes time-frequency location information of N ultra-wideband UWB segment signal groups, a same first response time at which X second initiating devices reply to a control device with a response frame, and subcarrier sets for all of the X second initiating devices to reply to the control device with the response frame, where a first initiating device is any one of the X second initiating devices, and N and X are integers greater than or equal to 2. The transceiver is further configured to send a first response signal based on the first response time and the subcarrier set for the first initiating device to reply to the control device with the response frame.

In addition, for another optional implementation of the communication apparatus in this aspect, refer to related content of the ninth aspect. Details are not described herein again.

In still another implementation, the communication apparatus includes the processor and the transceiver. The processor is configured to control the transceiver to perform data/signaling receiving and sending. The transceiver is configured to receive a poll frame. The poll frame includes time-frequency location information of N ultra-wideband UWB segment signal groups, a same second response time at which M second responding devices reply to a control device with a response frame, and subcarrier sets for all of the M second responding devices to reply to the control device with the response frame, where N and M are integers greater than or equal to 2, and a first responding device is any one of the M second responding devices. The transceiver is further configured to send a second response signal based on the second response time and the subcarrier set for the first responding device to reply to the control device with the response frame.

In addition, for another optional implementation of the communication apparatus in this aspect, refer to related content of the tenth aspect. Details are not described herein again.

In another implementation, the communication apparatus is a chip or a chip system. The processing unit may also be represented as a processing circuit or a logic circuit. The communication unit may be an input/output interface, an interface circuit, an output circuit, an input circuit, a pin, a related circuit, or the like on the chip or the chip system.

In an implementation process, the processor may be configured to perform, for example, but not limited to, baseband-related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor and a plurality of application processors (for example, but not limited to, a graphics processing unit and a multimedia processor) may be integrated on a same chip. Such a chip may be referred to as a system-on-a-chip (System-on-a-Chip, SoC). Whether the components are separately disposed on different chips or integrated and disposed on one or more chips usually depends on a requirement of a product design. Implementation forms of the foregoing components are not limited in embodiments of this application.

According to a twelfth aspect, this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the foregoing information, the processor outputs the foregoing information to a transceiver, so that the transceiver transmits the information. After the foregoing information is outputted by the processor, other processing may further need to be performed on the information before the information arrives at the transceiver. Similarly, during receiving of the foregoing input information by the processor, the transceiver receives the foregoing information, and inputs the foregoing information to the processor. Further, after the transceiver receives the foregoing information, other processing may further need to be performed on the information before the information is inputted into the processor.

Based on the foregoing principle, for example, sending the poll frame mentioned in the foregoing methods may be understood as outputting the poll frame by the processor.

Unless otherwise specified, or if operations such as sending and receiving related to the processor do not contradict an actual function or internal logic of the operations in related descriptions, all the operations may be more generally understood as operations such as outputting, receiving, and inputting of the processor, instead of operations such as sending and receiving directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory (non-transitory) memory, for example, a read-only memory (Read-Only Memory, ROM). The memory and the processor may be integrated on a same chip, or may be separately disposed on different chips. A type of the memory and a manner of disposing the memory and the processor are not limited in embodiments of this application.

According to a thirteenth aspect, this application further provides a communication system. The system includes at least one first initiating device and at least two first responding devices in the foregoing aspects. In another possible design, the system may further include another device that interacts with the first initiating device and the first responding device in the solutions provided in this application.

According to a fourteenth aspect, this application provides a computer-readable storage medium, configured to store instructions. When the instructions are run by a computer, the method according to any one of the first aspect to the tenth aspect is implemented.

According to a fifteenth aspect, this application further provides a computer program product including instructions. When the computer program product runs on a computer, the method according to any one of the first aspect to the tenth aspect is implemented.

According to a sixteenth aspect, this application provides a chip system. The chip system includes a processor and an interface, the interface is configured to obtain a program or instructions, and the processor is configured to invoke the program or the instructions to implement or support a second communication apparatus in implementing a function in any one of the first aspect to the tenth aspect, for example, determining or processing at least one of data and information in the foregoing methods. In a possible design, the chip system further includes a memory. The memory is configured to store program instructions and data that are necessary for a terminal. The chip system may include a chip, or may include a chip and another discrete component.

BRIEF DESCRIPTION OF DRAWINGS

FIG. 1(*a*) is a diagram of a structure of a system architecture according to an embodiment of this application;

FIG. 1(*b*) is a diagram of a structure of another system architecture according to an embodiment of this application;

FIG. 2(*b*) is a diagram of a ranging procedure of double-sided two way ranging according to an embodiment of this application;

FIG. 8 is a schematic interaction flowchart of another signal transmission method according to an embodiment of this application;

DESCRIPTION OF EMBODIMENTS

Figure 2A:
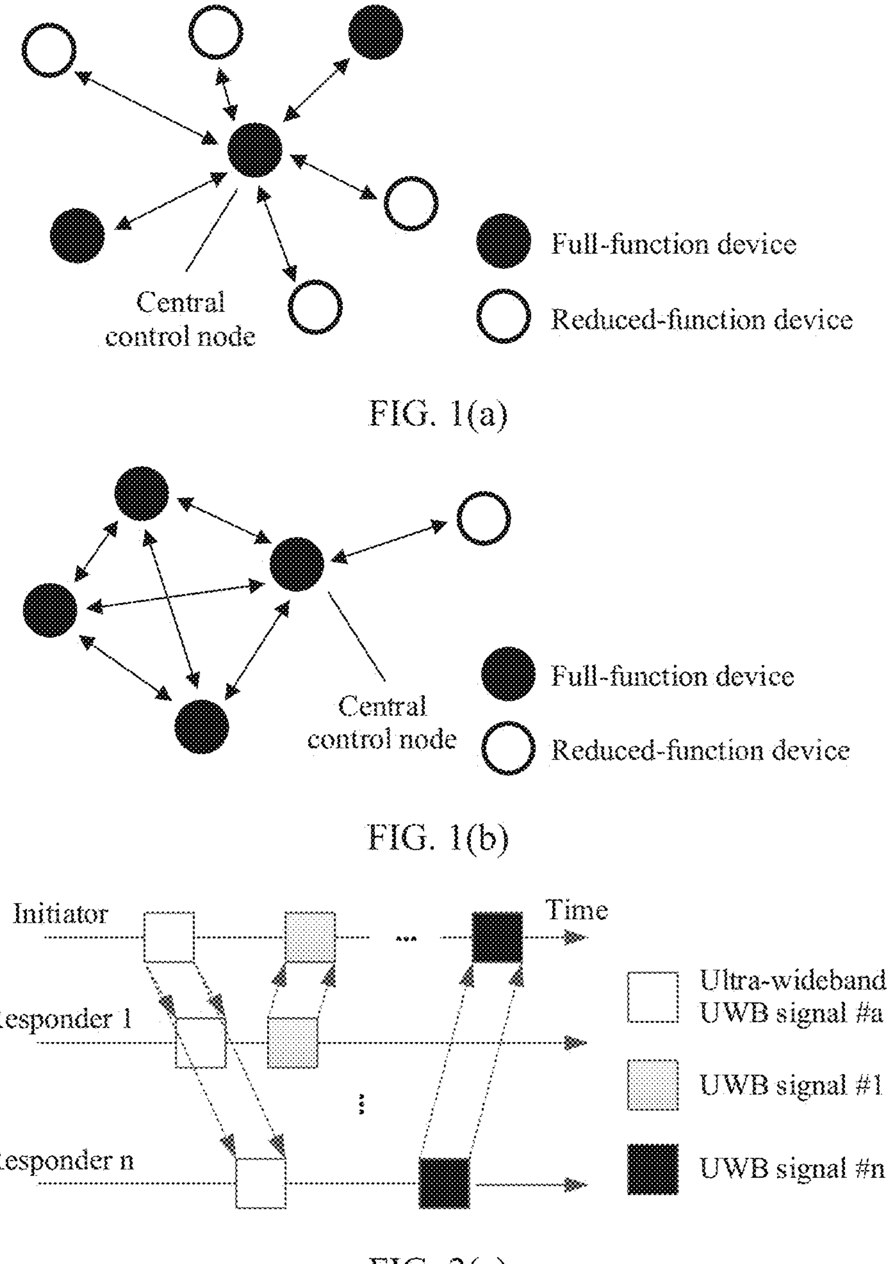
FIG. 2(*a*) is a diagram of a ranging procedure of single-sided two way ranging according to an embodiment of this application.

The following clearly describes the technical solutions in embodiments of this application with reference to accompanying drawings in embodiments of this application.

1. System Architecture

To better understand signal transmission methods disclosed in embodiments of this application, system architectures to which embodiments of this application are applicable are described.

The system architectures to which embodiments of this application are applicable are shown in FIG. 1(*a*) and FIG. 1(*b*). Both FIG. 1(*a*) and FIG. 1(*b*) include a full-function device and a reduced-function device. FIG. 1(*a*) shows a star topology system architecture. In this architecture, a central control node performs data communication with one or more other nodes. FIG. 1(*b*) shows a peer-to-peer topology system structure. In this architecture, a central control node may perform data communication with one or more other nodes, and other different nodes may also perform data communication with each other.

In embodiments of this application, the nodes in FIG. 1(*a*) and FIG. 1(*b*) include but are not limited to central control points such as a communication server, a router, a switch, a network bridge, a computer, a mobile phone, another network device, and another terminal device, a personal area network (personal area network, PAN), and a PAN coordinator.

It may be understood that a wireless communication system in embodiments of this application includes but is not limited to a narrowband internet of things (narrowband internet of things, NB-IoT) system, a long term evolution (long term evolution, LTE) system, three application scenarios of a 5G mobile communication system: enhanced mobile broadband (enhanced mobile broadband, eMBB), ultra-reliable low-latency communication (ultra-reliable low-latency communication, URLLC), and massive machine-type communications (massive machine-type communications, mMTC), a wireless fidelity (wireless fidelity, Wi-Fi) system, or a mobile communication system after 5G.

A network device in embodiments of this application is a device having a wireless transceiver function, is configured to communicate with a terminal device, and may be an evolved NodeB (evolved NodeB, eNB or eNodeB) in LTE, a base station in a 5G network, a base station in a future evolved public land mobile network (public land mobile network, PLMN), a broadband network gateway (broadband network gateway, BNG), an aggregation switch, a non-3rd-generation partnership project (3rd generation partnership project, 3GPP) access device, or the like. Optionally, a network device in embodiment of this application may include base stations in various forms, for example, a macro base station, a micro base station (also referred to as a small cell), a relay station, an access point, a device for implementing a function of a base station in the future, an access node in a Wi-Fi system, a transmission reception point (transmitting and receiving point, TRP), a transmission point (transmitting point, TP), a mobile switching center, and a device that functions as a base station in communication such as device-to-device (Device-to-Device, D2D), vehicle-to-everything (vehicle-to-everything, V2X), and machine-to-machine (machine-to-machine, M2M). This is not specifically limited in embodiments of this application.

A terminal device in embodiments of this application may include various handheld devices, vehicle-mounted devices, wearable devices, or computing devices that have a wireless communication function, or other processing devices connected to a wireless modem. The terminal device may also refer to user equipment (user equipment, UE), an access terminal, a subscriber unit (subscriber unit), a user agent, a cellular phone (cellular phone), a smartphone (smartphone), a wireless data card, a personal digital assistant (personal digital assistant, PDA) computer, a tablet computer, a wireless modem (modem), a handheld device (handset), a laptop computer (laptop computer), a machine type communication (machine type communication, MTC) terminal, a communication device carried on a high-altitude aircraft, a wearable device, an uncrewed aerial vehicle, a robot, a terminal in device-to-device (device-to-device, D2D) communication, a terminal in vehicle-to-everything (vehicle-to-everything, V2X), a terminal device in virtual reality (virtual reality, VR), a terminal device in augmented reality (augmented reality, AR), a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a terminal device in a future communication network, or the like. This is not limited in this application.

For ease of understanding embodiments disclosed in this application, the following two points are described.

(1) In embodiments disclosed in this application, an example in which a scenario is a scenario of a 5G new radio (new radio, NR) network in a wireless communication network is used for description. It should be noted that solutions in embodiments disclosed in this application may be further applied to another wireless communication network, and a corresponding name may also be replaced with a name of a corresponding function in the another wireless communication network.

(2) All aspects, embodiments, or features of this application are presented in embodiments disclosed in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be alternatively used.

An ultra-wideband (ultra-wideband, UWB) technology is a wireless carrier communication technology. In this technology, data transmission is performed through a nanosecond-level non-sinusoidal narrow pulse, so that a wide spectrum range is occupied. For ranging, precision of measurement or sensing is related to a signal bandwidth. A larger signal bandwidth indicates higher precision of sensing or ranging. Therefore, it is proposed that a UWB solution is used to perform ranging, to improve the precision of ranging and sensing.

Figure 2B:
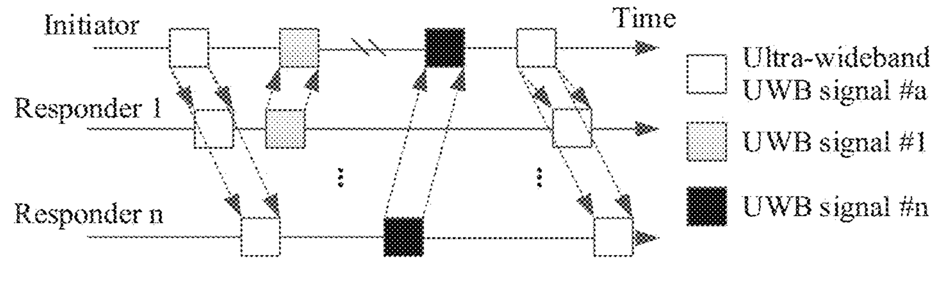

Currently, a method for performing ranging on a plurality of nodes by one node includes single-sided two way ranging (single-sided two way ranging, SS-TWR) and double-sided two way ranging (double-sided two way ranging, DS-TWR). A procedure for performing SS-TWR ranging on a plurality of nodes by one node is shown in FIG. 2(*a*). An initiator broadcasts a UWB signal #a used for ranging. A responder 1 to a responder n receive the UWB signal #a, and the responder 1 to the responder n reply to the UWB signal #a from the initiator through scheduling or contention, that is, the responder 1 to the responder n reply to the initiator with a UWB signal #1 to a UWB signal #n, respectively. A UWB signal replied with by each responder carries a time at which the responder receives the UWB signal #a and a time at which the responder replies with the UWB signal. For example, for the responder #1, the UWB signal #1 replied with by the responder #1 carries a time at which the responder #1 receives the UWB signal #a and a time at which the responder #1 sends the UWB signal #1. Therefore, the initiator may calculate a time of flight (time of flight, TOF) between the initiator and each responder based on receiving and sending times carried in the UWB signal replied with by each responder and UWB signal receiving and sending times for the initiator, to complete ranging on a plurality of responders.

A procedure for performing DS-TWR ranging on a plurality of nodes by one node is shown in FIG. 2(*b*). Through comparison with FIG. 2(*a*), it can be learned that a difference between the DS-TWR ranging procedure and the SS-TWR ranging procedure lies in that after receiving a UWB signal replied with by each responder, an initiator broadcasts a UWB signal #a again, the UWB signal #a carries times at which the initiator receives the UWB signal replied with by each responder and a time at which the initiator sends the UWB signal #a. In this way, after receiving the UWB signal #a, each responder may calculate a TOF between the responder and the initiator based on UWB signal receiving and sending times for the responder. Therefore, not only the initiator may complete ranging on each responder, but also each responder may complete ranging on the initiator, that is, double-sided ranging is implemented.

However, because a bandwidth of the UWB system is excessively large, to reduce interference to another narrowband device caused by the UWB system during operation, the Federal Communications Commission imposes a strict limitation on a power spectral density of a UWB signal. In one aspect, total energy of a UWB signal transmitted within one millisecond in a bandwidth of 500 MHz is limited to 37 nJ, and this limitation reduces coverage of the UWB signal. In other words, if ranging is performed by using the UWB signals shown in FIG. 2(*a*) and FIG. 2(*b*), coverage of the UWB signal is small. Consequently, a signal-to-noise ratio of the UWB signal received at a receiving end is low, and ranging performance is further affected.

Figure 3:
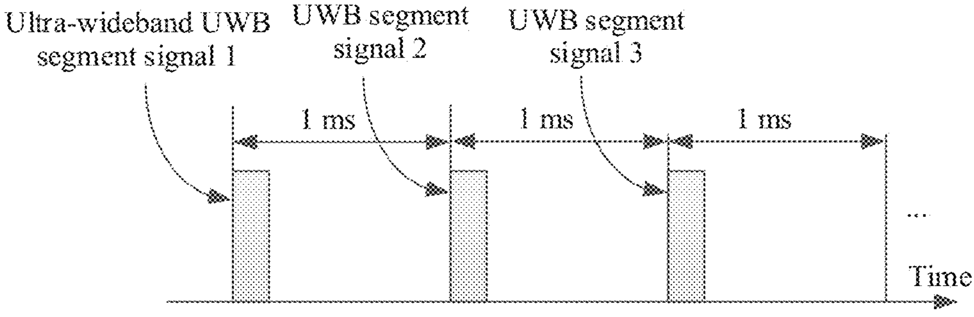
FIG. 3 is a diagram of a structure of a UWB segment signal according to an embodiment of this application.

Therefore, it is proposed that energy of a UWB signal is transmitted together in a shorter time, so as to improve instantaneous power of the transmitted signal, increase coverage of the UWB signal, and increase a signal-to-noise ratio of the UWB signal received at a receiving end. Based on this, in some scenarios in which transmit power needs to be increased, a transmitting end divides a to-be-transmitted UWB signal into a plurality of segments, and a time length of each UWB segment signal is less than 1 millisecond. For example, in FIG. 3, a divided UWB segment signal includes a UWB segment signal 1, a UWB segment signal 2, and a UWB segment signal 3, and a transmitting end sends only one of the UWB segment signals within each millisecond.

Figure 4:
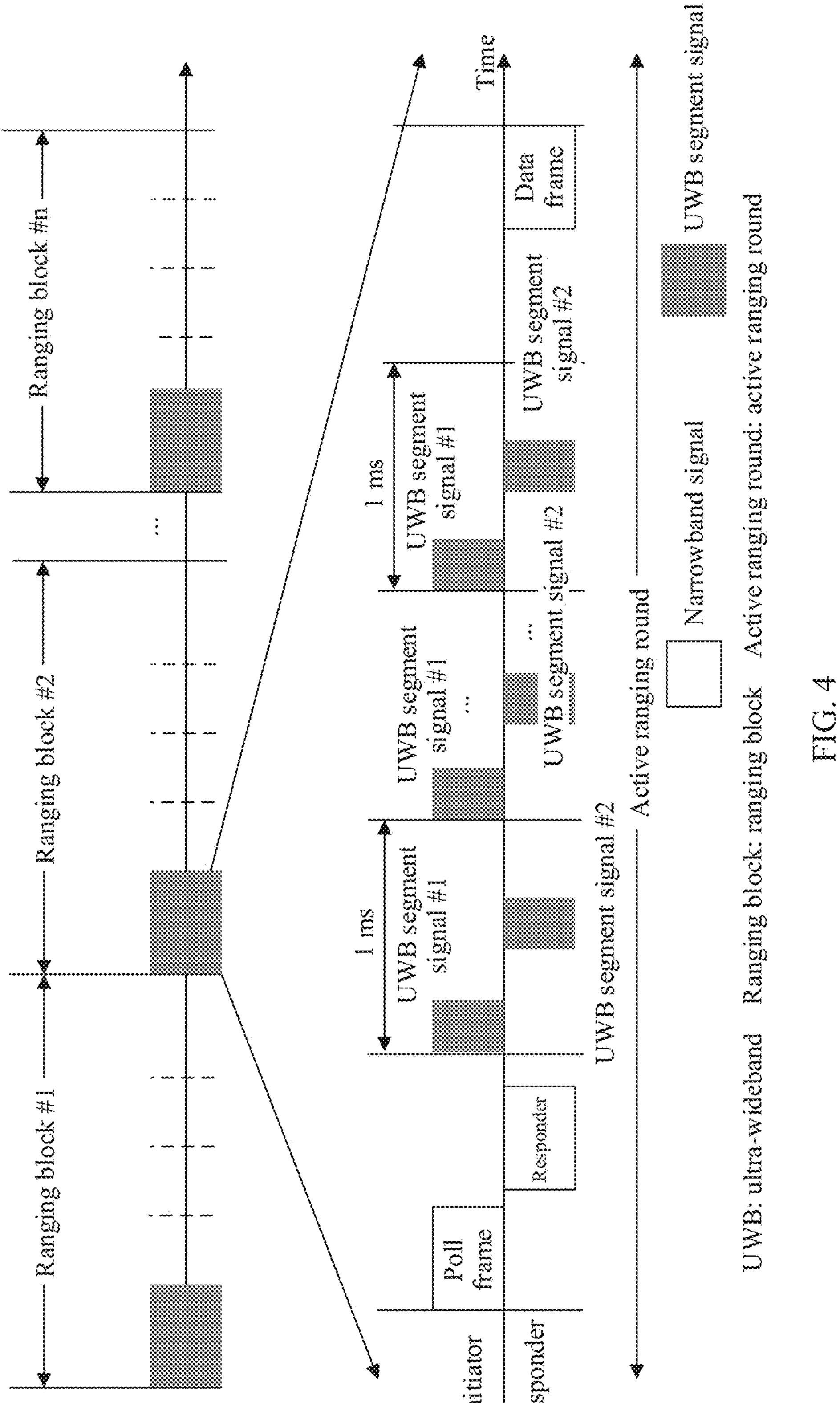
FIG. 4 is a diagram of a ranging procedure of one-to-one ranging according to an embodiment of this application.

Currently, a procedure of performing ranging between one node and one node based on the UWB segment signal is shown in FIG. 4. When an initiator performs ranging on a responder, a plurality of ranging blocks (ranging blocks) are included, and one ranging block includes an active ranging round (active ranging round).

In the active ranging round, the initiator sends a poll (poll) frame by using a narrowband signal, where the poll frame indicates time-frequency location information of a plurality of UWB segment signals #1. The responder receives the poll frame, and when determining to participate in the ranging round of the initiator, the responder replies to the initiator with a response frame, where the response frame carries time-frequency location information for replying to the initiator with a plurality of UWB segment signals #2. A process in which the initiator sends the poll frame and the responder replies with the response frame is a negotiation phase in the ranging round, that is, the initiator and the responder negotiate for the time-frequency location information for sending the plurality of UWB segment signals #1 and the time-frequency location information for replying with the plurality of UWB segment signals #2. The initiator separately sends the plurality of UWB segment signals #1 based on the time-frequency location information of the plurality of UWB segment signals #1. The responder separately receives the plurality of UWB segment signals #1 based on the time-frequency location information of the plurality of UWB segment signals #1. The responder separately replies with the plurality of UWB segment signals #2 based on the time-frequency location information of the plurality of UWB segment signals #2. The initiator separately receives the plurality of UWB segment signals #2 based on the time-frequency location information of the plurality of UWB segment signals #2. Finally, the responder reports, to the initiator through a data frame, times for receiving the plurality of UWB segment signals #1 and times for sending the plurality of UWB segment signals #2. Therefore, the initiator calculates a TOF based on times for sending the plurality of UWB segment signals #1, times for receiving the plurality of UWB segment signals #2, the times at which the responder receives the plurality of UWB segment signals #1, and the times at which the responder sends the plurality of UWB segment signals #2, to complete ranging on the responder.

However, in the foregoing process in which the initiator uses the UWB segment signals to perform one-to-one ranging on the responder, the initiator needs to complete ranging on the responder within multiple milliseconds, resulting in low ranging efficiency. If the initiator performs one-to-many ranging on a plurality of responders, and the initiator still schedules all responders one by one in the foregoing manner, a process of scheduling the plurality of responders is complex, a ranging time is long, and ranging efficiency is low.

In embodiments of this application, a first initiating device is any one of a plurality of second initiating devices. Each of the plurality of second initiating devices is a device that initiates a ranging round, and each second initiating device may initiate a ranging request to another device by sending a poll frame. A first responding device is any one of a plurality of second responding devices. Each of the plurality of second responding devices may receive a poll frame sent by the first initiating device. If the second responding device determines to join a ranging round of the first initiating device, the second responding device may reply to the first initiating device with a response frame, to determine to join the ranging round of the first initiating device.

2. Signal Transmission Method 100

Figure 5:
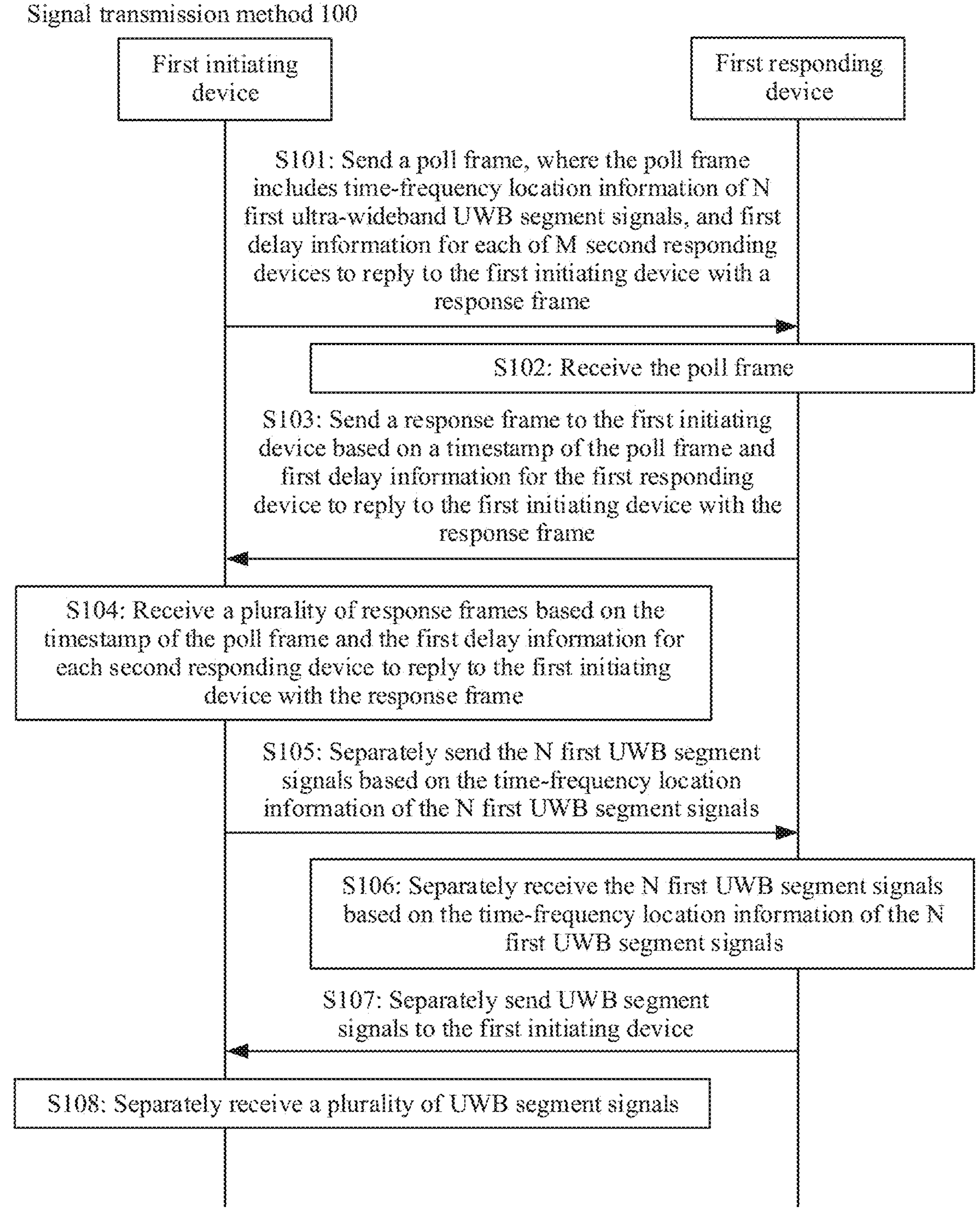
FIG. 5 is a schematic interaction flowchart of a signal transmission method according to an embodiment of this application.

An embodiment of this application provides the signal transmission method 100. FIG. 5 is a schematic interaction flowchart of the signal transmission method 100. The signal transmission method 100 is described from a perspective of interaction between a first initiating device and a first responding device. The signal transmission method 100 includes but is not limited to the following steps.

S101: The first initiating device sends a poll frame, where the poll frame includes time-frequency location information of N first ultra-wideband UWB segment signals, and first delay information for each of M second responding devices to reply to the first initiating device with a response frame.

N and M are integers greater than or equal to 2. The N first UWB segment signals are N parts in a UWB signal used for ranging by the first initiating device, that is, the first initiating device divides the UWB signal used for ranging into the N first UWB segment signals. This manner can increase transient power of a transmitted signal, increase coverage of the signal, and increase a signal-to-noise ratio of a signal received at a receiving end.

Figure 6:
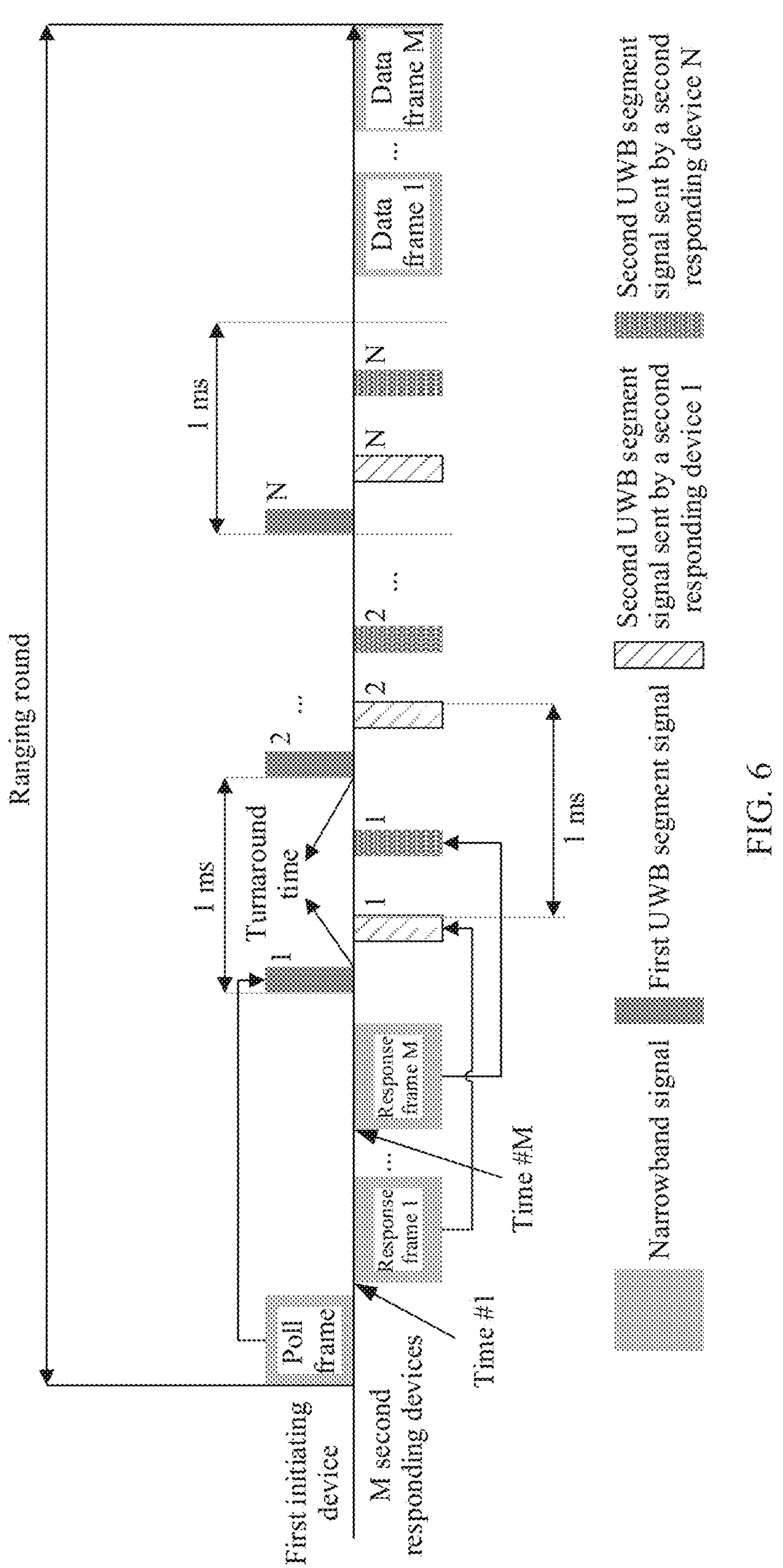
FIG. 6 is a diagram of a ranging procedure according to an embodiment of this application.

A time length of each of the N first UWB segment signals is less than 1 ms, and a time interval between every two first UWB segment signals is greater than or equal to 1 ms. The time length of each first UWB segment signal and the time interval between every two first UWB segment signals are not limited in embodiments of this application. In this embodiment of this application, an example in which the time interval between every two first UWB segment signals is 1 ms is used for description. For example, time-frequency location information of each of the N first ultra-wideband UWB segment signals is shown in FIG. 6, and a time interval between every two first UWB segment signals in FIG. 6 is 1 ms.

In addition, a delay in the first delay information is a delay relative to sending the poll frame by the first initiating device, that is, a delay relative to a timestamp of the poll frame. Different second responding devices have different first delay information, that is, delays for all second responding devices to reply to the first initiating device with response frames are different. Therefore, all the second responding devices reply to the first initiating device with the response frames after different delays since a time at which the first device sends the poll frame. It can be learned that the first initiating device configures one piece of first delay information for each second responding device to reply to the first initiating device with the response frame, so that all the second responding devices can reply to the first initiating device with the response frames at different times, thereby joining a ranging round of the first initiating device.

For example, a delay in first delay information for a responding device #1 to reply to the first initiating device with a response frame is 5 μs, a delay in first delay information for a responding device #2 to reply to the first initiating device with a response frame is 8 μs, and a moment at which the first initiating device sends the poll frame is a moment #A. If both the responding device #1 and the responding device #2 determine to participate in ranging initiated by the first initiating device, the responding device #1 replies to the first initiating device with the response frame at a moment after 5 us since the moment #A, and the responding device #2 replies to the first initiating device with the response frame at a moment after 8 us since the moment #A. Further, both the responding device #1 and the responding device #2 join the ranging round of the first initiating device.

The timestamp of the poll frame may be carried in the poll frame, or may be delivered by the first initiating device to the M second responding devices by using other signaling. For example, the first initiating device notifies the M second responding devices of the timestamp of the poll frame based on downlink control information (downlink control information, DCI).

The poll frame includes the time-frequency location information of the N first UWB segment signals used when the first initiating device performs ranging, so as to broadcast the time-frequency location information of the N first UWB segment signals to the M second responding devices. In this manner, the M second responding devices each may subsequently receive the N first UWB segment signals based on the time-frequency location information of the N first UWB segment signals.

The poll frame includes the first delay information for each of the M second responding devices to reply to the first initiating device with the response frame, which indicates that the first initiating device initiates a ranging request to the M second responding devices. Each of the M second responding devices has one piece of first delay information for replying to the first initiating device with the response frame, which indicates that the first initiating device implements scheduling of narrowband signals to the M second responding devices in a time division manner. Therefore, all of the M second responding devices may reply to the first device with the response frames at different times, to participate in the ranging round of the first initiating device. Further, this manner helps implement ranging performed by the first initiating device on a plurality of second responding devices, that is, helps improve ranging efficiency.

It may be understood that the first initiating device may send the poll frame to the M second responding devices in a broadcast manner, to reduce signaling overheads.

In an optional implementation, the poll frame may further include second delay information for each of the M second responding devices to reply to the first UWB segment signals that are from the first initiating device. Delays in the second delay information are delays relative to all of the N first UWB segment signals. In other words, the first initiating device configures a delay for each second responding device to reply to the N first UWB segment signals that are from the first initiating device. This manner helps all the second responding devices to reply to the first UWB segment signals at different times.

In another optional implementation, the poll frame further includes a same piece of third delay information for the M second responding devices to reply to the first UWB segment signals that are from the first initiating device, and an orthogonal sequence index of each second responding device. The orthogonal sequence of each second responding device is used by the second responding device to generate an orthogonal UWB segment signal. In other words, the first initiating device configures the same delay information for the M second responding devices to reply to the N first UWB segment signals, and different orthogonal sequence indexes for generating the orthogonal UWB segment signals by all the second responding devices. In this manner, all the second responding devices may reply to the first orthogonal UWB signals from the first initiating device at a same time, and the orthogonal UWB segment signal is determined based on the orthogonal sequence index of the second responding device.

In this manner, the first initiating device configures the poll frame, so that all of the M second responding devices reply to the first orthogonal UWB segment signals at the same time, therefore, the first initiating device also receives, at a same time, the first orthogonal UWB segment signals replied with by all the second responding devices. It can be learned that the first initiating device does not need to frequently receive the orthogonal UWB segment signals from a plurality of second responding devices within each time interval of the first UWB segment signals, but only needs to receive the orthogonal UWB segment signals from the plurality of second responding devices at a fixed time, thereby reducing power consumption of the first initiating device.

To be specific, the first initiating device is in an active state when sending the N first UWB segment signals and receiving a plurality of first orthogonal UWB segment signals. The first initiating device is in an idle state in interval times of the N first UWB segment signals other than times for sending the N first UWB segment signals and times for receiving the plurality of first orthogonal UWB segment signals. It can be learned that this manner greatly reduces a time at which the first initiating device is in the active state, and can reduce the power consumption of the first initiating device.

In still another optional implementation, the poll frame further includes fourth delay information for each second responding device to send a data frame to the first initiating device. A delay in the fourth delay information is a delay relative to the last time interval in time intervals of the N first UWB segment signals. The data frame includes time difference between receiving and sending UWB segment signal for the second responding device. To be specific, the first initiating device configures, through the poll frame, reporting time difference between receiving and sending UWB segment signal for each second responding device. Different second responding devices have different fourth delay information, so that the different second responding devices send data frames to the first initiating device at different times. This manner helps the first initiating device obtain time difference between receiving and sending UWB segment signal for a plurality of second responding devices, and further helps the first initiating device calculate TOFs for the plurality of responding devices, to implement ranging on the plurality of responding devices.

Optionally, the poll frame further includes addresses of the M second responding devices. Therefore, after receiving the poll frame, each second responding device determines, based on address information in the poll frame, whether the second responding device can participate in the ranging round of the first initiating device.

It can be learned from the foregoing that, in addition to the time-frequency location information of the N first UWB segment signals, the poll frame further includes one or more items in the following Table 1.

TABLE 1

| Address of a second responding device | First delay information | Second delay information/Third delay information | Fourth delay information |
|---|---|---|---|
| Addr 1 | $t_{res\_1}$ | $t_{uwb\_1}$ | $t_{data\_1}$ |
| Addr 2 | $t_{res\_2}$ | $t_{uwb\_2}$ | $t_{data\_2}$ |
| . . . | . . . | . . . | . . . |
| Addr m | $t_{res\_m}$ | $t_{uwb\_m}$ | $t_{data\_m}$ |

S102: The first responding device receives the poll frame.

S103: The first responding device sends a response frame to the first initiating device based on a timestamp of the poll frame and first delay information for the first responding device to reply to the first initiating device with the response frame.

The first responding device is any one of the M second responding devices. The response frame is used to confirm the time-frequency location information of the N first UWB segment signals in the poll frame. If any second responding device in the M second responding devices determines to join the ranging round of the first initiating device, the second responding device may send a response frame to the first initiating device.

The poll frame received by any second responding device includes the first delay information for the second responding device to reply to the first initiating device with the response frame. Therefore, any second responding device may send the response frame to the first initiating device based on a delay in the first delay information for the second responding device and the timestamp of the poll frame. It may be understood that any second responding device determines, based on a delay in the first delay information for the second responding device and the timestamp of the poll frame, a time at which the second responding device sends the response frame, and then sends the response frame to the first initiating device at the time.

For example, as shown in FIG. 6, a second responding device #1 determines, based on first delay information for the second responding device #1 and a timestamp of a poll frame, a sending time as a time #1, and a second responding device #M determines, based on first delay information for the second responding device #M and the timestamp of the poll frame, a sending time as a time #M. In this case, the second responding device #1 sends a response frame 1 to a first initiating device at the time #1, and the second responding device #M sends a response frame M to the first initiating device at the time #M.

To be specific, any responding device in the M second responding devices may send a response frame to the first initiating device based on the first delay information for the responding device, and different second responding devices send response frames to the first initiating device at different times. In other words, the different responding devices may send the response frames to the first initiating device at the different times, to join the ranging round of the first initiating device. In this manner, a plurality of second responding devices may join the ranging round of the first initiating device, so that the first initiating device implements ranging on the plurality of second responding devices.

S104: The first initiating device receives a plurality of response frames based on the timestamp of the poll frame and the first delay information for each second responding device to reply to the first initiating device with the response frame.

Correspondingly, the first initiating device may determine, based on the timestamp of the poll frame and the first delay information for each second responding device to reply to the first initiating device with the response frame, a time at which each second responding device sends the response frame, so that the first initiating device may receive the response frames from a plurality of second responding devices at different times at which the response frames are received.

The first initiating device may determine, based on the received response frames, a second responding device that is in the M second responding devices and that determines to join the ranging round, so that the ranging may be subsequently performed by using a UWB segment signal replied with by the second responding device that sends the response frame.

S105: The first initiating device separately sends the N first UWB segment signals based on the time-frequency location information of the N first UWB segment signals.

The first initiating device sends the N first UWB segment signals respectively at different time-frequency locations of the N first UWB segment signals. For example, as shown in FIG. 6, the first initiating device sends the N first UWB segment signals respectively at different time-frequency locations.

In an optional implementation, that the first initiating device separately sends the N first UWB segment signals based on the time-frequency location information of the N first UWB segment signals includes: When a first timer does not expire and M response frames are received, the first initiating device separately sends the N first UWB segment signals based on the time-frequency location information of the N first UWB segment signals; or when S response frames are received and a first timer expires, the first initiating device separately sends the N first UWB segment signals based on the time-frequency location information of the N first UWB segment signals. The first timer is triggered when the poll frame is sent, and S is an integer greater than or equal to 1 and less than M.

It can be learned that the first initiating device starts the first timer when sending the poll frame. A time of the first timer is self-defined by the first initiating device. When the first timer does not expire and response frames replied with by all of the M second responding devices are received, the first initiating device separately sends the N first UWB segment signals based on the time-frequency location information of the N first UWB segment signals. When response frames from some of the M second responding devices are received and the first timer expires, the first initiating device no longer continues to wait for a reply from another second responding device, but separately sends the N first UWB segment signals based on the time-frequency location information of the N first UWB segment signals. This manner can avoid a ranging failure caused by permanently waiting for a reply with a response frame from a second responding device by the first initiating device.

Optionally, when the first timer expires, the first initiating device does not receive a response frame replied with by any second responding device, that is, S is equal to 0. In this manner, the first initiating device re-sends the poll frame, that is, re-broadcasts the poll frame to the M second responding devices, to re-request the M second responding devices to join the ranging round.

S106: The first responding device separately receives the N first UWB segment signals based on the time-frequency location information of the N first UWB segment signals.

The poll frame received by any second responding device includes the time-frequency location information of the N first UWB segment signals, so that any second responding device may receive the N first UWB segment signals respectively at different time-frequency locations based on the time-frequency location information of the N first UWB segment signals.

S107: The first responding device separately sends UWB segment signals to the first initiating device.

Each time any responding device receives a first UWB segment signal, any response frame replies to the first UWB segment signal from the first initiating device, that is, sends a UWB segment signal to the first initiating device.

In an optional implementation, when the poll frame further includes the second delay information for each second responding device to reply to the first UWB segment signals that are from the first initiating device, any second responding device separately sends N second UWB segment signals to the first initiating device based on the second delay information for the second responding device to reply to the first UWB segment signals that are from the first initiating device.

In other words, in this manner, each second responding device may determine, based on the second delay information for the second responding device, times for sending the N second UWB segment signals to the first initiating device, so as to separately send the N second UWB segment signals to the first initiating device at the determined times. All the second responding devices have different second delay information. Therefore, within each time interval of the first UWB segment signals, all the second responding devices send second UWB segment signals to the first initiating device at different times.

For example, as shown in FIG. 6, all second responding devices send second UWB segment signals to the first initiating device at different times within each time interval of the first UWB segment signals, and each second responding device separately sends N second UWB segment signals.

In another optional implementation, when the poll frame further includes the same piece of third delay information for the M second responding devices to reply to the first UWB segment signals that are from the first initiating device, and the orthogonal sequence index of each second responding device, any second responding device separately sends N first orthogonal UWB segment signals to the first initiating device based on the third delay information. The first orthogonal UWB segment signals are determined based on the orthogonal sequence index of the first responding device.

To be specific, within each time interval of the first UWB segment signals, different second responding devices send first orthogonal UWB segment signals to the first initiating device at a same time, that is, a plurality of second responding devices send, at the same time, first orthogonal UWB segment signals that are orthogonal in a code division manner. A time at which a first orthogonal UWB segment signal is sent within each time interval of the first UWB segment signals is determined based on the third delay information and a time at which the first UWB segment signal is sent within the time interval of the first UWB segment signals.

A first orthogonal UWB segment signal from each second responding device is determined based on an orthogonal sequence index of the second responding device. An implementation in which each second responding device generates the first orthogonal UWB segment signal based on the orthogonal sequence index is not limited in embodiments of this application. For example, different first orthogonal UWB segment signals may be implemented based on M sequences of different parameters, or a repetition of M sequences of different parameters. Formulae for generating the M sequence are as follows:

$$d(n) = 1 - 2x(m) \tag{1}$$

$$m = [n + 43N_{ID}]\text{mod}L \tag{2}$$

Herein, $0 \leq n \leq L$, $x(i+7)=[x(i+4)+x(i)]\text{mod } 2$, L indicates a length of an M sequence, $N_{ID}$ is an orthogonal sequence index allocated in a poll frame, and a quantity of pulses of a first orthogonal UWB segment signal is ZL, where Z is a positive integer. In addition, [x(6) x(5) x(4) x(3) x(2) x(1) x(0)]=[1110110]. In this case, the first orthogonal UWB segment signal is obtained by encoding the M sequence whose length is L through binary phase shift keying (binary phase shift keying, BPSK) and performing encoding for Z repetitions.

Figure 7:
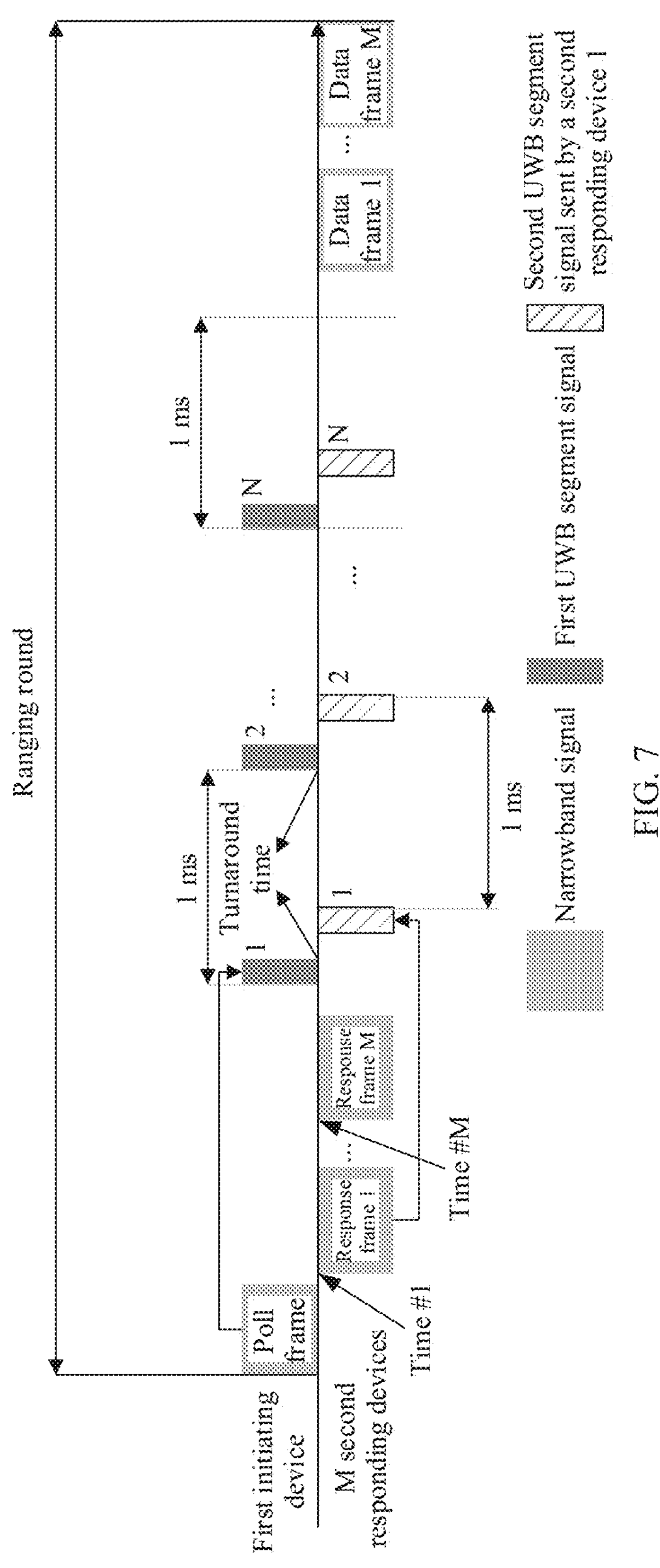
FIG. 7 is a diagram of another ranging procedure according to an embodiment of this application.

For example, as shown in FIG. 7, within each time interval of the first UWB segment signals, all second responding devices send different first orthogonal UWB segment signals to the first initiating device at a same time, and each second responding device separately sends N first orthogonal UWB segment signals.

In this manner, within each time interval of the first UWB segment signals, different second responding devices send different first orthogonal UWB segment signals to the first device at a same time, so that the first initiating device also receives, at a same time, different first orthogonal UWB segment signals from a plurality of second responding devices. Further, the first initiating device is in the active state when sending the N first UWB segment signals and receiving the plurality of first orthogonal UWB segment signals. The first initiating device is in the idle state in the interval times of the N first UWB segment signals other than the times for sending the N first UWB segment signals and the times for receiving the plurality of first orthogonal UWB segment signals.

Compared with the foregoing case in which all the second responding devices send the second UWB segment signals at different times, the first initiating device does not need to frequently receive a plurality of second UWB segment signals. This manner can reduce active time of the first initiating device, thereby reducing the power consumption of the first initiating device.

In addition, in this manner, within each time interval of the first UWB segment signals, a quantity of turnarounds between a time for sending the first UWB signal by the first initiating device and a time for receiving the first orthogonal UWB segment signals replied with by a plurality of second responding devices by the first initiating device may be one, thereby reducing a risk of occupying a turnaround time. In addition, an idle time within each time interval of the first UWB segment signals increases, and a plurality of second responding devices may reply with response frames at different times in the idle time, so that a quantity of second responding devices joining the ranging of the first initiating device can be increased, and ranging efficiency can be improved.

S108: The first initiating device separately receives a plurality of UWB segment signals.

Correspondingly, when the poll frame further includes the second delay information for each second responding device to reply to the first UWB segment signals that are from the first initiating device, the first initiating device separately receives the plurality of second UWB segment signals based on the second delay information for each second responding device to reply to the first UWB segment signals that are from the first initiating device.

Optionally, when the poll frame further includes the same piece of third delay information for the M second responding devices to reply to the first UWB segment signals that are from the first initiating device, and the orthogonal sequence index of each second responding device, the first initiating device separately receives the plurality of first orthogonal UWB segment signals based on the third delay information and the orthogonal sequence index of each second responding device.

It may be understood that an implementation in which the first initiating device separately receives the plurality of UWB segment signals is similar to an implementation in which each second responding device separately sends the UWB segment signals. For details, refer to the foregoing implementation in which each second responding device separately sends the UWB segment signals. Details are not described again.

In an optional implementation, the poll frame may further include the fourth delay information for each second responding device to send the data frame to the first initiating device. In this manner, the first responding device may send the data frame to the first initiating device based on the fourth delay information for the first responding device to send the data frame to the first initiating device, where the data frame includes times at which the first responding device receives the N first UWB segment signals and times for sending the N second UWB segment signals or the N first orthogonal UWB segment signals.

To be specific, any second responding device may further determine, based on the fourth delay information for the second responding device, a time for sending a data frame to the first initiating device, so that the second responding device sends the data frame to the first initiating device at the determined time, to report, to the first initiating device, time difference between receiving and sending UWB segment signal for the second responding device. Further, the first initiating device performs ranging based on the time difference between receiving and sending UWB segment signal.

Therefore, the first initiating device may receive a plurality of data frames based on the fourth delay information for each second responding device to send the data frame to the first initiating device, to obtain, from the plurality of data frames, time difference between receiving and sending UWB segment signal for a plurality of second responding devices, and further perform ranging on the plurality of second responding devices.

For example, as shown in FIG. 6 and FIG. 7, different second responding devices send data frames to the first initiating device at different times determined based on fourth delay information, and M second responding devices send M data frames to the first initiating device in total. The first initiating device receives the plurality of data frames at different times.

In this embodiment of this application, a time at which each second responding device sends the UWB segment signal and a time at which the first initiating device sends the first UWB segment signal need to be turned around, that is, the time at which each second responding device sends the UWB segment signal is staggered with the time at which the first initiating device sends the first UWB segment signal. For example, in FIG. 6 and FIG. 7, there is a turnaround time after the first initiating device finishes sending a first UWB segment signal and before the first initiating device starts to send a first UWB segment signal. In this manner, the first device may distinguish between a time for sending the first UWB segment signal and a time for receiving the UWB segment signals from the plurality of second responding devices, thereby facilitating ranging based on the two times.

It may be understood that this embodiment of this application further includes a procedure, obtained based on procedures of performing ranging on a plurality of responding devices by one initiating device in FIG. 6 and FIG. 7, of performing ranging on a plurality of responding devices by a plurality of initiating devices.

It can be learned that, in this embodiment of this application, the poll frame sent by the first initiating device includes the first delay information for each of the plurality of second responding devices to reply to the first initiating device with the response frame, that is, includes time division scheduling to the plurality of second responding devices. Therefore, response frames from the plurality of second responding devices may be received at different times, so that the plurality of second responding devices join a ranging or sensing process initiated by the first initiating device. Further, the first initiating device sends the N first UWB segment signals to start the ranging round. The plurality of second responding devices reply to the first initiating device with the UWB segment signals, to participate in the ranging round of the first initiating device. This manner helps the first initiating device implement ranging on the plurality of second responders in a short time, and helps improve the ranging efficiency.

3. Signal Transmission Method 200

Figure 8:
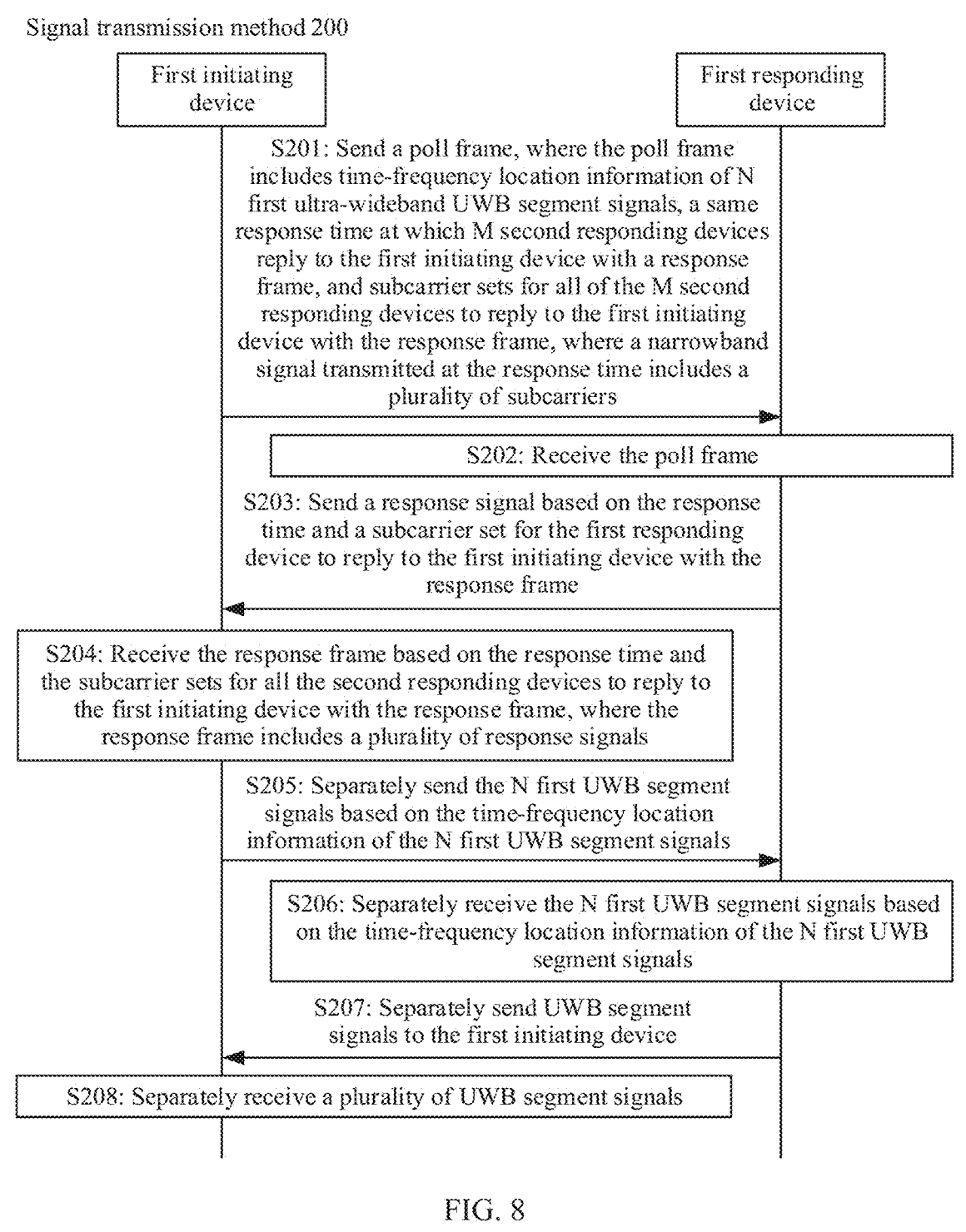

An embodiment of this application further provides the signal transmission method 200. FIG. 8 is a schematic interaction flowchart of the signal transmission method 200. The signal transmission method 200 is described from a perspective of interaction between a first initiating device and a first responding device. The signal transmission method 200 includes but is not limited to the following steps.

S201: The first initiating device sends a poll frame, where the poll frame includes time-frequency location information of N first ultra-wideband UWB segment signals, a same response time at which M second responding devices reply to the first initiating device with a response frame, and subcarrier sets for all of the M second responding devices to reply to the first initiating device with the response frame, where a narrowband signal transmitted at the response time includes a plurality of subcarriers.

N and M are integers greater than or equal to 2.

For the N first ultra-wideband UWB segment signals and the time-frequency location information of the N first ultra-wideband UWB segment signals, refer to the descriptions in S101. Details are not described again.

It can be learned that the first initiating device configures, through the poll frame, the same response time at which the M second responding devices reply to the first initiating device with the response frame, and the subcarrier sets for all the second responding devices to reply to the first initiating device with the response frame. To be specific, the first initiating device implements narrowband scheduling on the M second responding devices in a frequency division manner, so that the M second responding devices may reply to the first initiating device with the response frame at the same response time and on different subcarrier sets. That is, in this manner, the M second responding devices may join a ranging round of the first initiating device in a frequency division manner, thereby helping the first initiating device implement sensing or measurement on a plurality of second responding devices, and improving ranging efficiency.

In this embodiment of this application, for another implementation of the poll frame, refer to the descriptions in S101. Details are not described again.

With reference to the implementations of the poll frame in S101, it can be learned that the poll frame may include information in Table 2.

TABLE 2

| Address of a second responding device | Subcarrier set for a response frame | Second delay information/Third delay information | Subcarrier set for a data frame |
|---|---|---|---|
| Addr 1 | $\{C_{res1}\}$ | $t_{uwb\_1}$ | $\{C_{data1}\}$ |
| Addr 2 | $\{C_{res2}\}$ | $t_{uwb\_2}$ | $\{C_{data2}\}$ |
| . . . | . . . | . . . | . . . |
| Addr m | $\{C_{resm}\}$ | $t_{uwb\_m}$ | $\{C_{datam}\}$ |

S202: The first responding device receives the poll frame.

S203: The first responding device sends a response signal based on the response time and a subcarrier set for the first responding device to reply to the first initiating device with the response frame.

Figure 9:
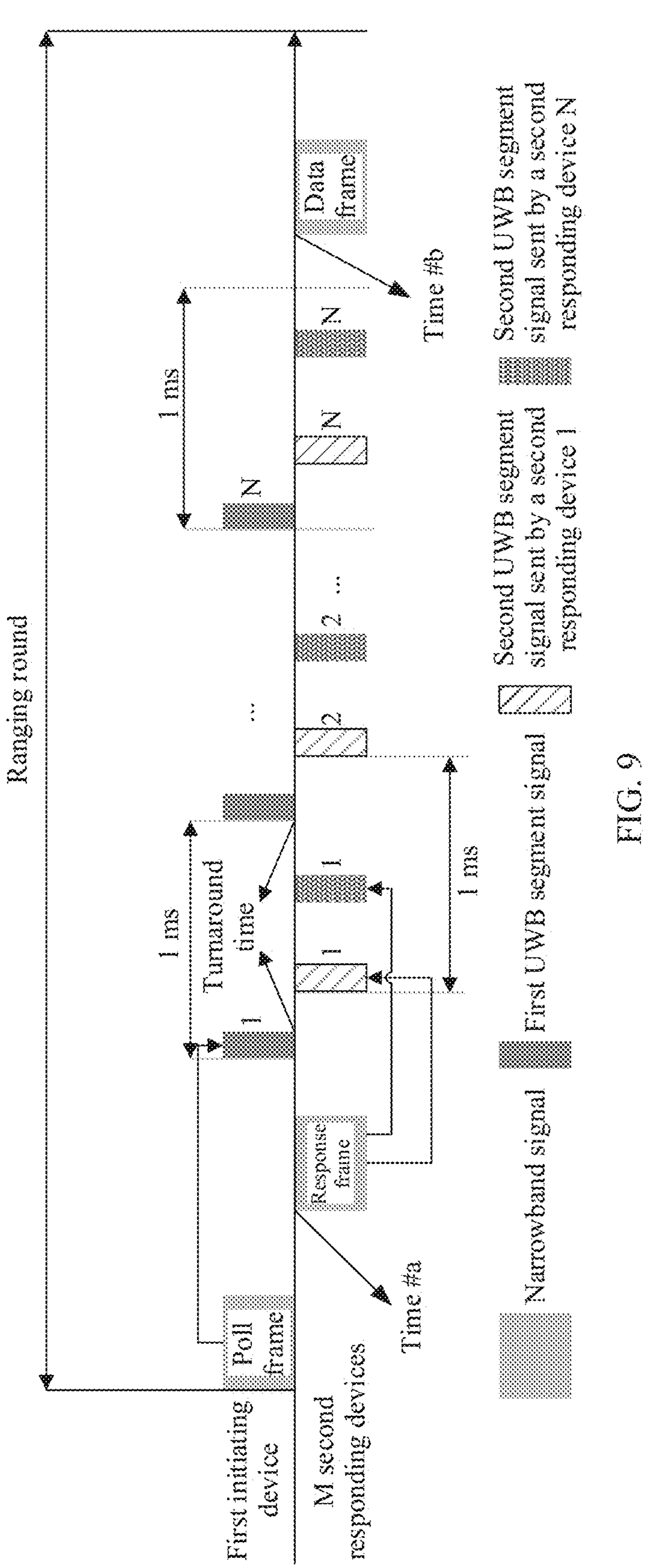
FIG. 9 is a diagram of still another ranging procedure according to an embodiment of this application.

Because the poll frame includes the response time of the M second responding devices and the subcarrier sets for all the second responding devices, when determining to participate in ranging of the first initiating device, any second responding device may send a response signal to the first initiating device on the subcarrier set for the first responding device at the response time. For example, as shown in FIG. 9, a plurality of second responding devices send response signals to a first initiating device on different subcarrier sets at a time #a, where a plurality of response signals form a response frame.

S204: The first initiating device receives the response frame based on the response time and the subcarrier sets for all the second responding devices to reply to the first initiating device with the response frame, where the response frame includes a plurality of response signals.

Correspondingly, the first initiating device receives the response frame at the response time, where the response frame includes response signals on different subcarrier sets, and the response signals on the different subcarrier sets come from different second responding devices.

In this embodiment of this application, the first initiating device receives response signals from a plurality of second responding devices at the same response time. Compared with S104 in which the first initiating device receives the response frames from different second responding devices at different times, in this implementation, when receiving the response frame, the first initiating device is only in an active state at the response time, so that active time of the first initiating device can be reduced, thereby reducing power consumption of the first initiating device.

S205: The first initiating device separately sends the N first UWB segment signals based on the time-frequency location information of the N first UWB segment signals.

S206: The first responding device separately receives the N first UWB segment signals based on the time-frequency location information of the N first UWB segment signals.

For implementations of S205 and S206, refer to the foregoing implementations of S105 and S106. Details are not described again.

S207: The first responding device separately sends UWB segment signals to the first initiating device.

A UWB signal sent by any second responding device to the first initiating device is a reply signal for a first UWB segment signal sent by the first initiating device.

In an optional implementation, when the poll frame further includes second delay information for each second responding device to reply to the first UWB segment signals that are from the first initiating device, the first responding device separately sends N second UWB segment signals to the first initiating device based on the second delay information for the first responding device to reply to the first UWB segment signals that are from the first initiating device. For this specific implementation, refer to the descriptions in S107.

For example, as shown in FIG. 9, after receiving first UWB segment signals that are from the first initiating device within each time interval of the first UWB segment signals, all second responding devices send second UWB segment signals to the first initiating device based on respective second delay information for the second responding devices at different times. Each second responding device separately sends N second UWB segment signals in total.

In another optional implementation, when the poll frame further includes a same piece of third delay information for the M second responding devices to reply to the first UWB segment signals that are from the first initiating device, and an orthogonal sequence index of each second responding device, the first responding device sends first orthogonal UWB segment signals to the first initiating device based on the third delay information and the orthogonal sequence index of the first responding device. For this specific implementation, refer to the descriptions in S107.

Figure 10:
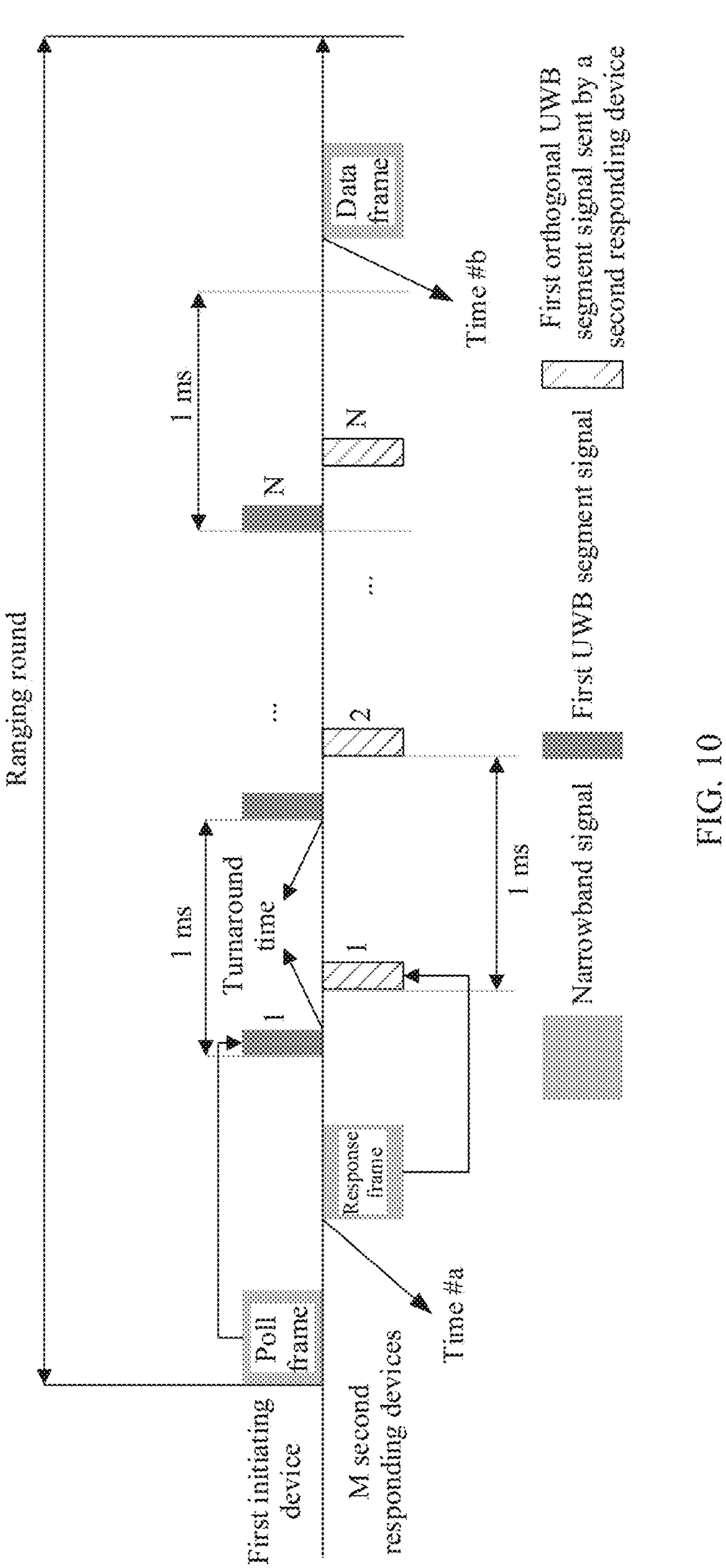
FIG. 10 is a diagram of still another ranging procedure according to an embodiment of this application.

For example, as shown in FIG. 10, after receiving first UWB segment signals within each time interval of the first UWB segment signals, all second responding devices send, at a same time determined based on the third delay information, first orthogonal UWB segment signals determined based on the orthogonal sequence index of each second responding device. Within time intervals of the N first UWB segment signals, each responding device sends N first orthogonal UWB segment signals in total to the first initiating device.

In addition, in this manner, within each time interval of the first UWB segment signals, a quantity of turnarounds between a time for sending the first UWB signal by the first initiating device and a time for receiving the first orthogonal UWB segment signals replied with by a plurality of second responding devices by the first initiating device may be one, thereby reducing a risk of occupying a turnaround time. This enhances robustness of a system. In addition, an idle time within each time interval of the first UWB segment signals increases, and a plurality of second responding devices may reply with response frames at different times in the idle time, so that a quantity of second responding devices joining the ranging of the first initiating device can be increased, namely, ranging efficiency can be improved.

S208: The first initiating device separately receives a plurality of UWB segment signals.

In an optional implementation, when the poll frame further includes the second delay information for each second responding device to reply to the first UWB segment signals that are from the first initiating device, the first initiating device receives a plurality of second UWB segment signals based on the second delay information for each second responding device to reply to the first UWB segment signals that are from the first initiating device.

In another optional implementation, when the poll frame further includes the same piece of third delay information for the M second responding devices to reply to the first UWB segment signals that are from the first initiating device, and the orthogonal sequence index of each second responding device, the first initiating device receives a plurality of first orthogonal UWB segment signals based on the third delay information and the orthogonal sequence index of each second responding device.

For a detailed implementation in which the first initiating device separately receives the plurality of UWB segment signals, refer to the descriptions in S108. Details are not described again.

In still another optional implementation, the poll frame further includes a same data frame time at which all the second responding devices send a data frame to the first initiating device, and subcarrier sets for all the second responding devices to send the data frame to the first initiating device. Therefore, the first responding device may further send a data signal based on the data frame time and a subcarrier set for the first responding device to send the data frame to the first initiating device. The data signal includes time difference between receiving, at a first responding device, the N first UWB segment signals and sending, at a first responding device, N second UWB segment signals, or and sending, at a first responding device, N first orthogonal UWB segment signals.

Correspondingly, the first initiating device may receive the data frame on different subcarrier sets at the data frame time, where the data frame includes data signals from a plurality of second responding devices. In this manner, the first initiating device does not need to receive data frames from different second responding devices at different times, but only needs to receive the data frame at one data frame time, thereby reducing the power consumption of the first initiating device.

It may be understood that this embodiment of this application further includes a procedure, obtained based on procedures of performing ranging on a plurality of responding devices by one initiating device in FIG. 9 and FIG. 10, of performing ranging on a plurality of responding devices by a plurality of initiating devices. It can be learned that, in this embodiment of this application, the first initiating device configures, through the poll frame, the same response time at which the M second responding devices reply with the response frame, and the subcarrier sets for all the second responding devices to reply with the response frame, that is, configures frequency division scheduling to the M second responding devices. In this manner, the M second responding devices send response signals to the first initiating device on different subcarrier sets at the same response time. Therefore, some or all of the M second responding devices may join the ranging round of the first initiating device, thereby improving the ranging efficiency.

4. Signal Transmission Method 300

Figure 11:
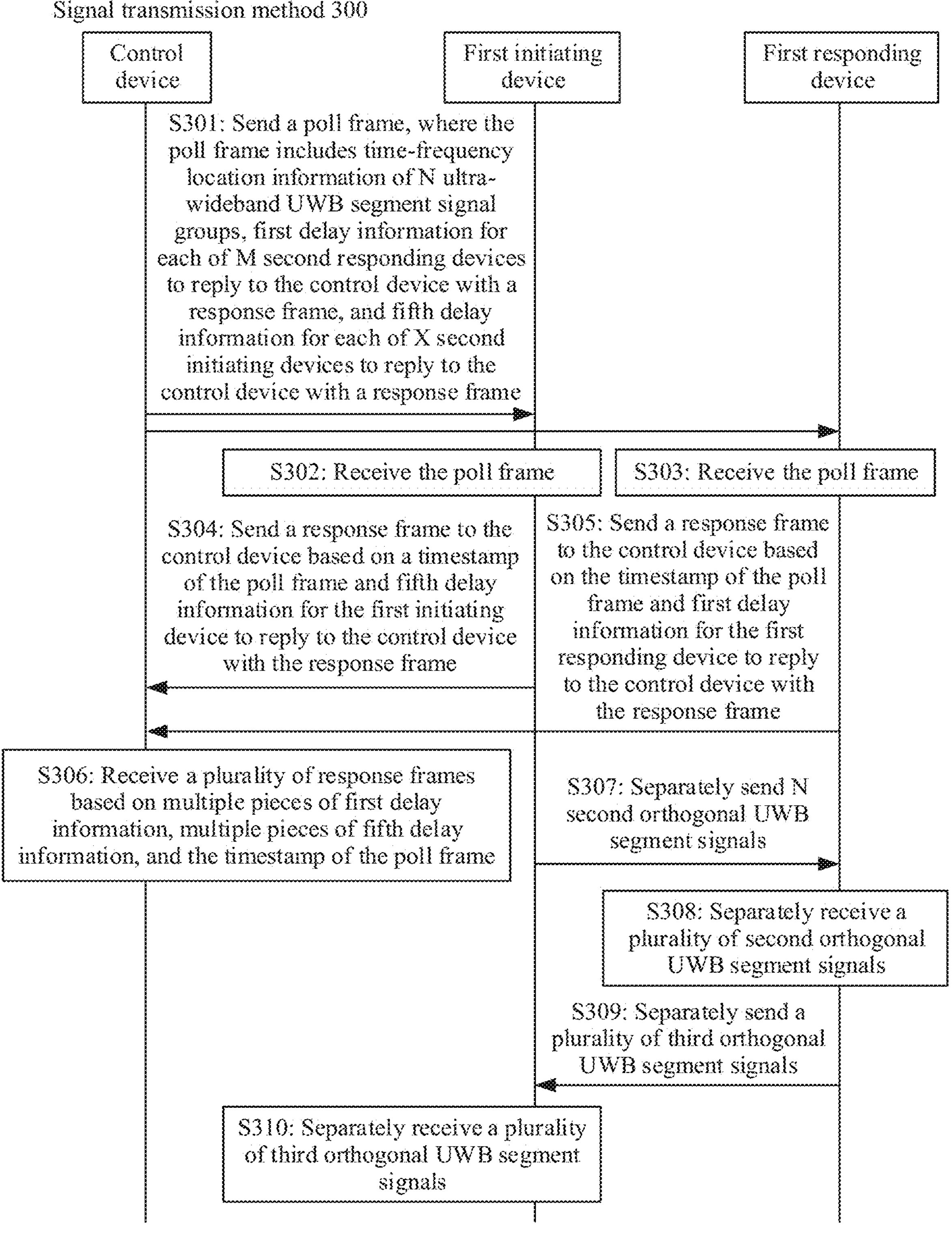
FIG. 11 is a schematic interaction flowchart of still another signal transmission method according to an embodiment of this application.

An embodiment of this application further provides the signal transmission method 300. FIG. 11 is a schematic interaction flowchart of the signal transmission method 300. The signal transmission method 300 is described from a perspective of interaction between a control device, a first initiating device, and a first responding device. The signal transmission method 300 includes but is not limited to the following steps.

S301: The control device sends a poll frame, where the poll frame includes time-frequency location information of N ultra-wideband UWB segment signal groups, first delay information for each of M second responding devices to reply to the control device with a response frame, and fifth delay information for each of X second initiating devices to reply to the control device with a response frame.

N, M, and X are integers greater than or equal to 2. The control device may be an independent device, or may be any one of the X second initiating devices. The UWB segment signal group includes a plurality of second orthogonal UWB segment signals. Both a delay in the first delay information and a delay in the fifth delay information are delays relative to a timestamp of the poll frame.

It can be learned that the control device configures, through the poll frame, delay information for each of the M second responding devices and each of the X second initiating devices to send the response frame to the first initiating device, so as to implement time division scheduling to the M second responding devices and the X second initiating devices. In this manner, a plurality of devices in the M second responding devices and a plurality of devices in the X second initiating devices may join a same ranging round, thereby helping improve ranging efficiency.

In an optional implementation, the poll frame further includes an orthogonal sequence index of each second initiating device, an orthogonal sequence index of each of the M second responding devices, and a same piece of third delay information for all second responding devices to reply to second orthogonal UWB segment signals from the first initiating device. In this manner, any second initiating device may send N second orthogonal UWB segment signals based on the time-frequency location information of the N UWB segment signal groups and the orthogonal sequence index of the second initiating device. Therefore, any second responding device receives a plurality of second orthogonal UWB segment signals based on the time-frequency location information of the N UWB segment signal groups and the orthogonal sequence index of each second initiating device.

In addition, any second responding device may send N third orthogonal UWB segment signals based on the third delay information and the orthogonal sequence index of the second responding device. Therefore, any second initiating device may receive a plurality of third orthogonal UWB segment signals based on the third delay information and the orthogonal sequence index of each second responding device.

In another optional implementation, the poll frame further includes fourth delay information for each second responding device to send a data frame to a second initiating device, so that any second responding device may send a data frame based on the fourth delay information for the second responding device. The data frame includes times at which the second responding device receives second orthogonal UWB segment signals and times at which the second responding device sends third orthogonal UWB segment signals. Correspondingly, any first initiating device that joins the ranging round may receive a plurality of data frames based on the fourth delay information for each second responding device, and further perform ranging on a plurality of second responding devices based on time information carried in the data frames.

Optionally, the poll frame may further include addresses of the M second responding devices and addresses of the X second initiating devices, so as to request a device including address information to join a same ranging round.

S302: The first initiating device receives the poll frame.

S303: The first responding device receives the poll frame.

An implementation sequence of S302 and S303 is not limited in embodiments of this application. S302 is implemented after S303, or S303 may be implemented after S302.

Any one of the X second initiating devices may receive the poll frame. Any one of the M second responding devices may receive the poll frame.

S304: The first initiating device sends a response frame to the control device based on the timestamp of the poll frame and fifth delay information for the first initiating device to reply to the control device with the response frame.

Any second initiating device sends a response frame to the control device at a time determined based on the timestamp of the poll frame and the fifth delay information for the second initiating device. Different second initiating devices send response frames to the control device at different times based on different fifth delay information.

Figure 12:
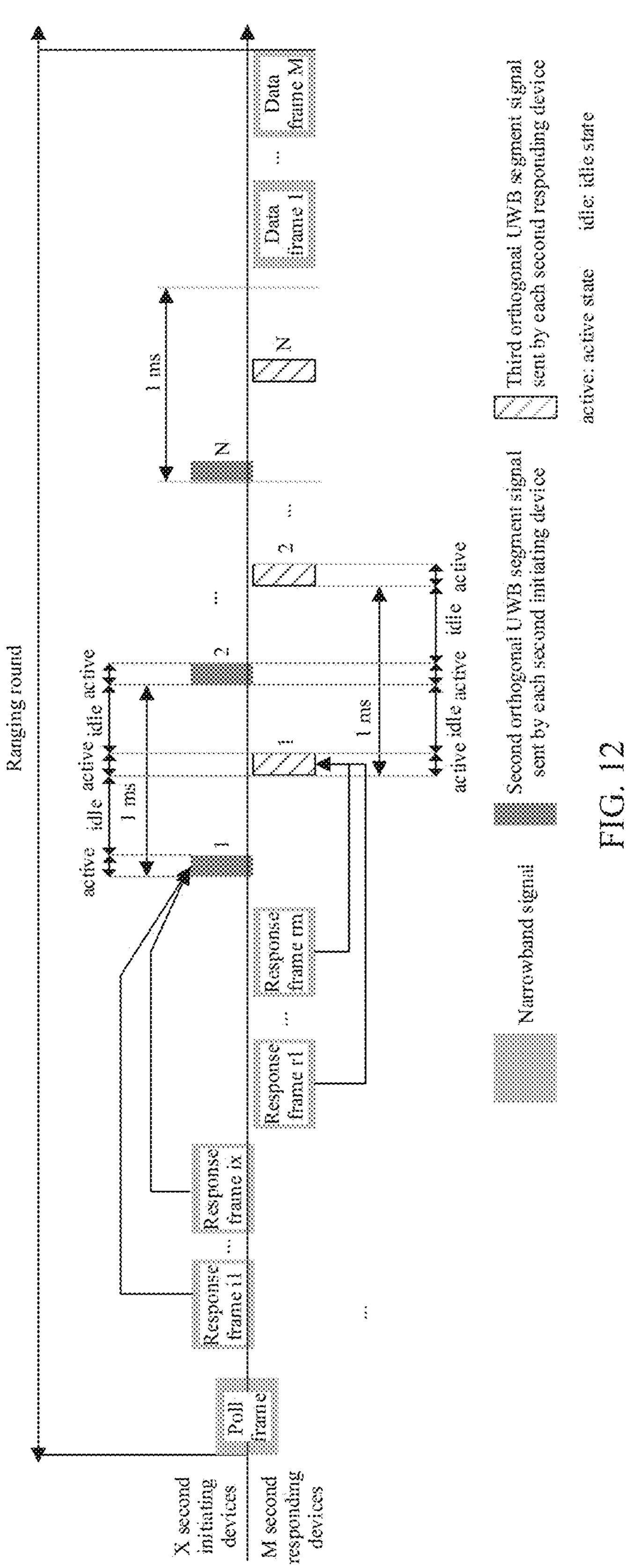
FIG. 12 is a diagram of still another ranging procedure according to an embodiment of this application.

For example, as shown in FIG. 12, a response frame sent by a second initiating device 1 is a response frame i1, a response frame sent by a second initiating device X is ix, and the X second initiating devices send response frames at different times.

S305: The first responding device sends a response frame to the control device based on the timestamp of the poll frame and first delay information for the first responding device to reply to the control device with the response frame.

Any second responding device sends a response frame to the control device at a time determined based on the timestamp of the poll frame and the first delay information for the second responding device. Different second responding devices send response frames to the control device at different times based on different first delay information.

For example, as shown in FIG. 12, a response frame sent by a second responding device 1 is a response frame r1, a response frame sent by a second responding device M is rm, and the M second responding devices send response frames at different times.

An implementation sequence of S304 and S305 is not limited in embodiments of this application. S304 is implemented after S305, or S305 may be implemented after S304.

S306: The control device receives a plurality of response frames based on multiple pieces of first delay information, multiple pieces of fifth delay information, and the timestamp of the poll frame.

Correspondingly, the control device may determine, based on the multiple pieces of fifth delay information and the timestamp of the poll frame, times at which a plurality of second initiating devices send response frames, so that the control device may receive response frames from different second initiating devices at different determined times. The control device may further determine, based on the multiple pieces of first delay information and the timestamp of the poll frame, times at which a plurality of second responding devices send response frames, so that the control device receives response frames from different second responding devices at different determined times.

S307: The first initiating device separately sends N second orthogonal UWB segment signals.

In an optional implementation, the poll frame further includes the orthogonal sequence index of each second initiating device. Therefore, any second initiating device may send N second orthogonal UWB segment signals based on the time-frequency location information of the N UWB segment signal groups and the orthogonal sequence index of the second initiating device. To be specific, each second initiating device that replies with a response frame may send, at N sending times determined based on the time-frequency location information of the N UWB segment signal groups, second orthogonal UWB segment signals determined based on the orthogonal sequence of the second initiating device.

Therefore, within each time interval of the UWB segment signal groups, a plurality of second initiating devices send different second orthogonal UWB segment signals at a same time, where each second orthogonal UWB segment signal is an orthogonal UWB segment signal determined by a corresponding second initiating device based on the orthogonal sequence index of the corresponding second initiating device. The plurality of second initiating devices send the second orthogonal UWB segment signals at one time within each time interval of the UWB segment signal groups, to reduce a risk of occupying a receive-to-transmit turnaround time for any second initiating device.

For example, as shown in FIG. 12, any one of the X second initiating devices separately sends N second orthogonal UWB segment signals at N times determined based on the time-frequency location information of the N UWB segment signal groups. Second orthogonal UWB segment signals sent by a plurality of second initiating devices are included at a location of each UWB segment signal group.

S308: The first responding device separately receives a plurality of second orthogonal UWB segment signals.

Correspondingly, any second responding device separately receives a plurality of second orthogonal UWB segment signals at the N times determined based on the time-frequency location information of the N UWB segment signal groups and based on the orthogonal sequence index of each second initiating device.

S309: The first responding device separately sends a plurality of third orthogonal UWB segment signals.

In an optional implementation, the poll frame further includes the orthogonal sequence index of each second initiating device, the orthogonal sequence index of each of the M second responding devices, and the same piece of third delay information for all the second responding devices to reply to the second orthogonal UWB segment signals from the first initiating device. Therefore, any second responding device may send, at the N times determined based on the third delay information, third orthogonal UWB segment signals determined based on the orthogonal sequence index of the second responding device. All the second responding devices reply to the first initiating device with different third orthogonal UWB segment signals at a same time determined based on the third delay information.

For example, as shown in FIG. 12, different second responding devices all reply with third orthogonal UWB segment signals at a same time.

In this manner, each second responding device may be in an active state (active) at times for receiving the second orthogonal UWB segment signals and times for sending the third orthogonal UWB segment signals, and may be in an idle state (idle) at another time, thereby reducing active time of each second responding device, and reducing power consumption of each second responding device.

S310: The first initiating device separately receives a plurality of third orthogonal UWB segment signals.

Correspondingly, any second initiating device receives, within each time interval of the UWB segment signal groups, different third orthogonal UWB segment signals from a plurality of second responding devices at a same time determined based on the third delay information.

In an optional implementation, the poll frame further includes the fourth delay information for each second responding device to send the data frame to the second initiating device. Therefore, any second responding device may send a data frame based on the fourth delay information for the second responding device. The data frame includes times at which the second responding device receives a plurality of second orthogonal UWB segment signals and times at which the second responding device sends a plurality of third orthogonal UWB segment signals. In other words, different second responding devices send different data frames at different times determined based on different fourth delay information.

Correspondingly, any second initiating device may receive a plurality of data frames at different times determined based on multiple pieces of fourth delay information, to obtain times at which a plurality of second responding devices receive a plurality of second orthogonal UWB segment signals and send a plurality of third orthogonal UWB segment signals, and further perform ranging based on the obtained times.

For example, as shown in FIG. 12, M second responding devices separately send data frames at different times determined based on different fourth delay information. Data frames sent by the M second responding devices are a data frame 1 to a data frame M, respectively.

In this embodiment of this application, the control device sends the poll frame, and configures, through the poll frame, the fifth delay information for each of the X second initiating devices to reply to the control device with the response frame and the first delay information for each of the M second responding devices to reply to the control device with the response frame, so that some or all of the X second initiating devices can reply to the control device with response frames at different times, and some or all of the M second responding devices can reply to the control device with response frames at different times. Therefore, a plurality of second initiating devices that reply with the response frames and a plurality of second responding devices that reply with the response frames join the same ranging round, thereby helping implement ranging performed by the plurality of second initiating devices on the plurality of second responding devices, and helping improve the ranging efficiency.

5. Signal Transmission Method 400

Figure 13A:
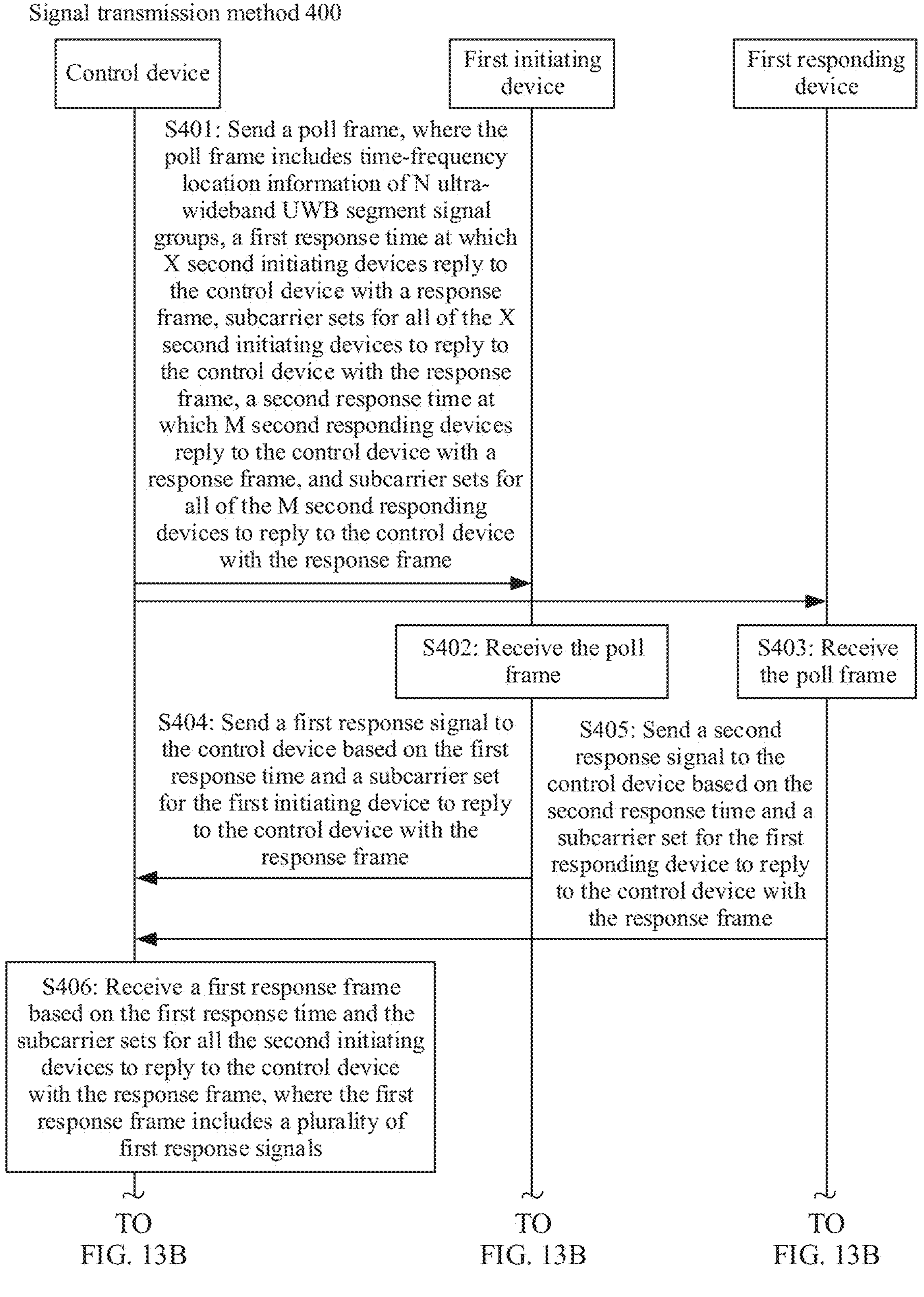
FIG. 13A and FIG. 13B are a schematic interaction flowchart of still another signal transmission method according to an embodiment of this application.
Figure 13B:
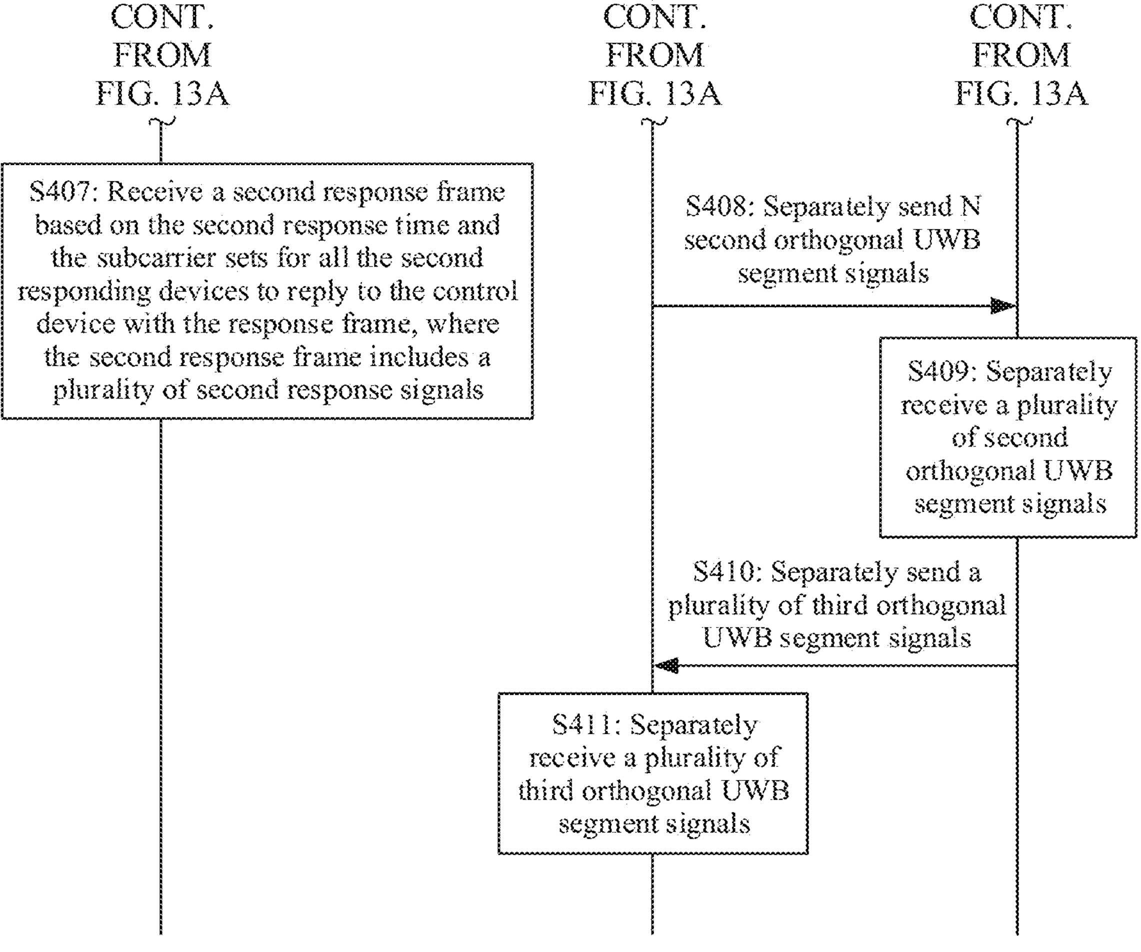

An embodiment of this application further provides the signal transmission method 400. FIG. 13A and FIG. 13B are a schematic interaction flowchart of the signal transmission method 400. The signal transmission method 400 is also described from a perspective of interaction between a control device, a first initiating device, and a first responding device. The signal transmission method 400 includes but is not limited to the following steps.

S401: The control device sends a poll frame, where the poll frame includes time-frequency location information of N ultra-wideband UWB segment signal groups, a first response time at which X second initiating devices reply to the control device with a response frame, subcarrier sets for all of the X second initiating devices to reply to the control device with the response frame, a second response time at which M second responding devices reply to the control device with a response frame, and subcarrier sets for all of the M second responding devices to reply to the control device with the response frame.

N, M, and X are integers greater than or equal to 2. The control device may be an independent device, or may be any one of the X second initiating devices. The UWB segment signal group includes a plurality of second orthogonal UWB segment signals.

The poll frame includes the first response time at which the X second initiating devices reply to the control device with the response frame and the subcarrier sets for all of the X second initiating devices to reply to the control device with the response frame, so that all of the X second initiating devices may reply to the control device with first response signals on different subcarrier sets at the first response time. The poll frame includes the second response time at which the M second responding devices reply to the control device with the response frame and the subcarrier sets for all of the M second responding devices to reply to the control device with the response frame, so that all of the M second responding devices may reply to the control device with second responding signals on different subcarrier sets at the second response time. To be specific, the control device may implement frequency division scheduling to the M second responding devices and frequency division scheduling to the X second initiating devices. Therefore, in this manner, a plurality of devices in the M second responding devices and a plurality of devices in the X second initiating devices may join a same ranging round, thereby helping improve ranging efficiency.

In addition, all of the M second responding devices reply to the control device with second response signals at a same time, and all of the X second initiating devices also reply to the control device with first response signals at a same time; and then the control device receives a first response frame at a same time, and receives a second response frame at a same time. This can reduce active time of the control device, that is, reduce power consumption of the control device. In addition, in this manner, multiple groups of second responding devices and multiple groups of second initiating devices may join the same ranging round, thereby implementing ranging performed by more second initiating devices on more second responding devices, and further improving the ranging efficiency.

For another implementation of the poll frame, refer to the descriptions in S301. Details are not described again.

S402: The first initiating device receives the poll frame.

S403: The first responding device receives the poll frame.

An implementation sequence of S402 and S403 is not limited in embodiments of this application. S402 is implemented after S403, or S403 may be implemented after S402.

S404: The first initiating device sends a first response signal to the control device based on the first response time and a subcarrier set for the first initiating device to reply to the control device with the response frame.

Any second initiating device may reply to the control device with a first response signal on the subcarrier set for the second initiating device at the first response time. Different second initiating devices send different first response signals to the control device on different subcarrier sets at the first response time.

Figure 14:
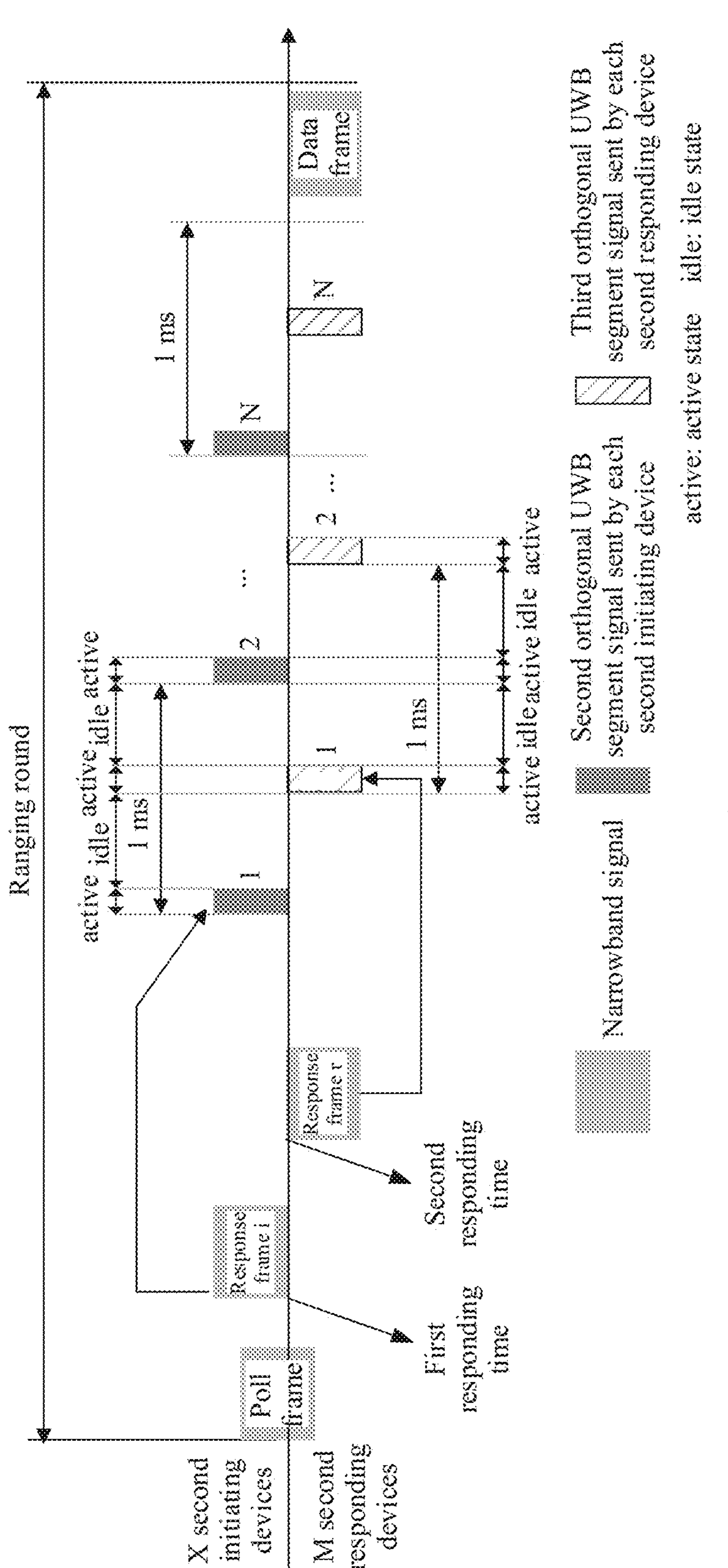
FIG. 14 is a diagram of still another ranging procedure according to an embodiment of this application.

For example, as shown in FIG. 14, a plurality of second initiating devices send different first response signals at a first response time, the plurality of first response signals form a first response frame (a response frame i), a plurality of second responding devices send different second response signals at a second response time, and the plurality of second response signals form a second response frame (a response frame r).

S405: The first responding device sends a second response signal to the control device based on the second response time and a subcarrier set for the first responding device to reply to the control device with the response frame.

An implementation sequence of S404 and S405 is not limited in embodiments of this application. S404 is implemented after S405, or S405 may be implemented after S404.

S406: The control device receives a first response frame based on the first response time and the subcarrier sets for all the second initiating devices to reply to the control device with the response frame, where the first response frame includes a plurality of first response signals.

S407: The control device receives a second response frame based on the second response time and the subcarrier sets for all the second responding devices to reply to the control device with the response frame, where the second response frame includes a plurality of second response signals.

An implementation sequence of S406 and S407 is not limited in embodiments of this application. S406 is implemented after S407, or S407 may be implemented after S406.

S408: The first initiating device separately sends N second orthogonal UWB segment signals.

S409: The first responding device separately receives a plurality of second orthogonal UWB segment signals.

S410: The first responding device separately sends a plurality of third orthogonal UWB segment signals.

S411: The first initiating device separately receives a plurality of third orthogonal UWB segment signals.

For implementations of S408 to S411, refer to the foregoing implementations of S307 to S310. Details are not described again.

In another optional implementation, the poll frame further includes a data frame time at which the M second responding devices send a data frame to a second initiating device, and subcarrier sets for all of the M second responding devices to send the data frame to the second initiating device. In this manner, different second responding devices may send data signals to the second initiating device on different subcarrier sets at the same data frame time, where a plurality of data signals form the data frame.

Correspondingly, any second initiating device may receive the data frame at the data frame time, where the data frame includes the plurality of data signals, and all the data signals are carried on the different subcarrier sets. Each data signal includes time difference between receiving and sending UWB segment signal for the first responding device, so that any second initiating device can perform ranging based on times carried in each data signal.

It can be learned that, in this embodiment of this application, the control device sends the poll frame, configures, for the X second initiating devices through the poll frame, the first response time at which the X second initiating devices reply to the control device with the response frame and the subcarrier sets for all of the X second initiating devices to reply to the control device with the response frame, and configures, for the M second responding devices through the poll frame, the second response time at which the M second responding devices reply to the control device with the response frame and the subcarrier sets for all of the M second responding devices to reply to the control device with the response frame, so that a plurality of second initiating devices in the X second initiating devices may reply to the control device with first response signals at the first response time, and a plurality of second responding devices in the M second responding devices reply to the control device with second response signals at the second response time. Therefore, a plurality of second initiating devices that reply with the response frame and a plurality of second responding devices that reply with the response frame join a same ranging round. Further, a plurality of second initiating devices can perform ranging on a plurality of second responding devices, thereby improving ranging efficiency.

It may be understood that this embodiment of this application further includes a procedure, obtained based on procedures of performing single-sided ranging on a plurality of responding devices by a plurality of initiating devices in FIG. 12 and FIG. 14, of performing double-sided ranging on a plurality of responding devices by a plurality of initiating devices.

It may be understood that, in the foregoing signal transmission method 100, all the second responding devices may further send data signals to the first initiating device on different subcarrier sets at a same time, where each data signal includes times at which a second responding device receives the first UWB segment signals and times at which the second responding device sends the second UWB segment signals or the first orthogonal UWB segment signals. In other words, an implementation in which each second responding device sends a data frame to the first initiating device in the signal transmission method 100 is not limited in embodiments of this application.

Similarly, in the foregoing signal transmission method 200, all the second responding devices may further send data frames to the first initiating device at different times. In other words, an implementation in which each second responding device sends a data frame to the first initiating device in the signal transmission method 200 is not limited in embodiments of this application.

Similarly, an implementation in which each second responding device sends a data frame to the first initiating device in the signal transmission method 300 and the signal transmission method 400 is not limited in embodiments of this application.

It may be understood that, in the foregoing signal transmission method 400, all the second responding devices and all the second initiating devices may reply to the control device with the response signals on different subcarrier sets at a same time, where a plurality of response signals form a response frame. Optionally, some of the X second initiating devices and some of the M second responding devices reply to the control device with the response signals on different subcarrier sets at a same time, and the other devices of the X second initiating devices and the other devices of the M second responding devices reply to the control device with the response signals on different subcarrier sets at another same time. In other words, a frequency division scheduling manner of the control device for the X second initiating devices and the M second responding devices in the signal transmission method 400 is not limited in embodiments of this application. Therefore, this helps support more second initiating devices and second responding devices to join a same ranging round.

6. Apparatus Embodiments

To implement all functions in the methods provided in embodiments of this application, a control device, a first initiating device, or a first responding device may include a hardware structure and/or a software module, to implement the foregoing functions in a form of the hardware structure, the software module, or a combination of the hardware structure and the software module. Whether a function in the foregoing functions is implemented by the hardware structure, the software module, or the combination of the hardware structure and the software module depends on particular applications and design constraints of the technical solutions.

Figure 15:
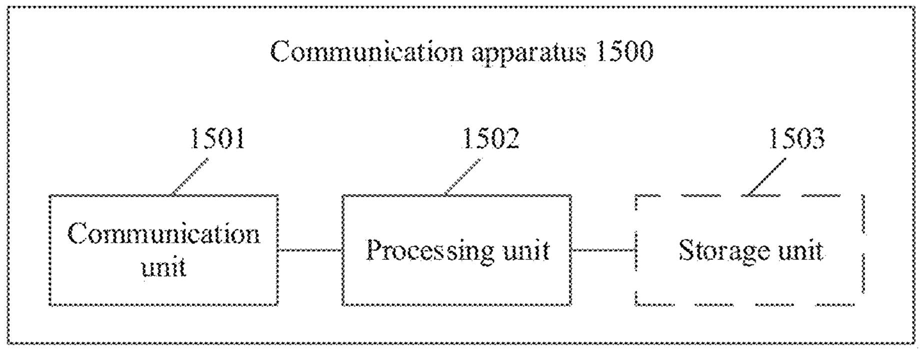
FIG. 15 is a diagram of a structure of a communication apparatus according to an embodiment of this application.

As shown in FIG. 15, an embodiment of this application provides a communication apparatus 1500. The communication apparatus 1500 may be a component (for example, an integrated circuit or a chip) of a first initiating device, or may be a component (for example, an integrated circuit or a chip) of a first responding device, or may be a component (for example, an integrated circuit or a chip) of a control device. Alternatively, the communication apparatus 1500 may be another communication unit, configured to implement the methods in the method embodiments of this application. The communication apparatus 1500 may include a communication unit 1501 and a processing unit 1502. Optionally, the communication apparatus 1500 may include a storage unit 1503.

In a possible design, one or more units in FIG. 15 may be implemented by one or more processors, may be implemented by one or more processors and memories, may be implemented by one or more processors and transceivers, or may be implemented by one or more processors, memories, and transceivers. This is not limited in embodiments of this application. The processor, the memory, and the transceiver may be disposed separately, or may be integrated.

The communication apparatus 1500 has a function of implementing a first initiating device described in embodiments of this application. Optionally, the communication apparatus 1500 has a function of implementing a first responding device described in embodiments of this application. Optionally, the communication apparatus 1500 has a function of implementing a control device described in embodiments of this application. For example, the communication apparatus 1500 includes a corresponding module, unit, or means (means) for the first initiating device to perform the steps that are related to the first initiating device and that are described in embodiments of this application. The function, unit, or means (means) may be implemented by software or hardware, or may be implemented by hardware executing corresponding software, or may be implemented by a combination of software and hardware. For details, refer to the corresponding descriptions in the foregoing corresponding method embodiments.

In a possible design, a communication apparatus 1500 may include a processing unit 1502 and a communication unit 1501. The processing unit 1502 is configured to control the communication unit 1501 to perform data/signaling receiving and sending.

The communication unit 1501 is configured to send a poll frame. The poll frame includes time-frequency location information of N first ultra-wideband UWB segment signals, and first delay information for each of M second responding devices to reply to a first initiating device with a response frame, where N and M are integers greater than or equal to 2. The communication unit 1501 is further configured to receive a plurality of response frames based on a timestamp of the poll frame and the first delay information for each second responding device to reply to the first initiating device with the response frame.

In an optional implementation, the poll frame further includes second delay information for each second responding device to reply to the first UWB segment signals that are from the first initiating device. The communication unit 1501 is further configured to: separately send the N first UWB segment signals based on the time-frequency location information of the N first UWB segment signals; and separately receive a plurality of second UWB segment signals based on the second delay information for each second responding device to reply to the first UWB segment signals that are from the first initiating device.

In an optional implementation, the poll frame further includes a same piece of third delay information for the M second responding devices to reply to the first UWB segment signals that are from the first initiating device, and an orthogonal sequence index of each second responding device. The communication unit 1501 is further configured to: separately send, by the first initiating device, the N first UWB segment signals based on the time-frequency location information of the N first UWB segment signals; and separately receive a plurality of first orthogonal UWB segment signals based on the third delay information and the orthogonal sequence index of each second responding device.

In an optional implementation, the communication apparatus 1500 is in an active state when sending the N first UWB segment signals and receiving the plurality of first orthogonal UWB segment signals. The communication apparatus 1500 is in an idle state in interval times of the N first UWB segment signals other than times for sending the N first UWB segment signals and times for receiving the plurality of first orthogonal UWB segment signals.

In an optional implementation, the poll frame further includes fourth delay information for each second responding device to send a data frame to the first initiating device. The communication unit 1501 is further configured to receive a plurality of data frames based on the fourth delay information for each second responding device to send the data frame to the first initiating device, where each of the plurality of data frames includes time difference between receiving, at a first responding device, the N first UWB segment signals and sending, at a first responding device, N second UWB segment signals, or and sending, at a first responding device, N first orthogonal UWB segment signals, and the first responding device is any one of the M second responding devices.

In an optional implementation, that the communication unit 1501 separately sends the N first UWB segment signals based on the time-frequency location information of the N first UWB segment signals is specifically used to: when a first timer does not expire and M response frames are received, separately send the N first UWB segment signals based on the time-frequency location information of the N first UWB segment signals; or when S response frames are received and a first timer expires, separately send the N first UWB segment signals based on the time-frequency location information of the N first UWB segment signals, where the first timer is triggered when the poll frame is sent, and S is an integer greater than or equal to 1 and less than M.

This embodiment of this application and the foregoing method embodiment are based on a same concept, and bring same technical effect. For a specific principle, refer to the descriptions of the foregoing embodiment. Details are not described again.

In another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N first ultra-wideband UWB segment signals, and first delay information for each of M second responding devices to reply to a first initiating device with a response frame, where N and M are integers greater than or equal to 2, and a first responding device is any one of the M second responding devices. The communication unit 1501 is further configured to send a response frame to the first initiating device based on a timestamp of the poll frame and the first delay information for the first responding device to reply to the first initiating device with the response frame.

In an optional implementation, the poll frame further includes second delay information for each second responding device to reply to the first UWB segment signals that are from the first initiating device. The communication unit 1501 is further configured to: separately receive the N first UWB segment signals based on the time-frequency location information of the N first UWB segment signals; and separately send N second UWB segment signals to the first initiating device based on the second delay information for the first responding device to reply to the first UWB segment signals that are from the first initiating device.

In another optional implementation, the poll frame further includes a same piece of third delay information for the M second responding devices to reply to the first UWB segment signals that are from the first initiating device, and an orthogonal sequence index of each second responding device. The communication unit 1501 is further configured to: separately receive, by the first responding device, the N first UWB segment signals based on the time-frequency location information of the N first UWB segment signals; and separately send N first orthogonal UWB segment signals to the first initiating device based on the third delay information, where the first orthogonal UWB segment signals are determined based on the orthogonal sequence index of the first responding device.

In still another optional implementation, the poll frame further includes fourth delay information for each second responding device to send a data frame to the first initiating device. The communication unit 1501 is further configured to send a data frame to the first initiating device based on the fourth delay information for the first responding device to send the data frame to the first initiating device, where the data frame includes time difference between receiving, at a first responding device, the N first UWB segment signals and sending, at a first responding device, N second UWB segment signals, or and sending, at a first responding device, N first orthogonal UWB segment signals.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to send a poll frame. The poll frame includes time-frequency location information of N first ultra-wideband UWB segment signals, a same response time at which M second responding devices reply to a first initiating device with a response frame, and subcarrier sets for all of the M second responding devices to reply to the first initiating device with the response frame, where a narrowband signal transmitted at the response time includes a plurality of subcarriers, and N and M are integers greater than or equal to 2. The communication unit 1501 is further configured to receive the response frame based on the response time and the subcarrier sets for all the second responding devices to reply to the first initiating device with the response frame, where the response frame includes a plurality of response signals. In an optional implementation, the poll frame further includes second delay information for each second responding device to reply to the first UWB segment signals that are from the first initiating device. The communication unit 1501 is further configured to: separately send the N first UWB segment signals based on the time-frequency location information of the N first UWB segment signals; and separately receive a plurality of second UWB segment signals based on the second delay information for each second responding device to reply to the first UWB segment signals that are from the first initiating device.

In an optional implementation, the poll frame further includes a same piece of third delay information for the M second responding devices to reply to the first UWB segment signals that are from the first initiating device, and an orthogonal sequence index of each second responding device. The communication unit 1501 is further configured to: separately send the N first UWB segment signals based on the time-frequency location information of the N first UWB segment signals; and separately receive a plurality of first orthogonal UWB segment signals based on the third delay information and the orthogonal sequence index of each second responding device.

In an optional implementation, the communication apparatus 1500 is in an active state when sending the N first UWB segment signals and receiving the plurality of first orthogonal UWB segment signals. The communication apparatus 1500 is in an idle state in interval times of the N first UWB segment signals other than times for sending the N first UWB segment signals and times for receiving the plurality of first orthogonal UWB segment signals.

In an optional implementation, the poll frame further includes a same data frame time at which all the second responding devices send a data frame to the first initiating device, and subcarrier sets for all the second responding devices to send the data frame to the first initiating device. The communication unit 1501 is further configured to receive the data frame based on the data frame time and the subcarrier sets for all the second responding devices to send the data frame to the first initiating device, where the data frame includes a plurality of data signals, each of the plurality of data signals includes time difference between receiving, at a first responding device, the N first UWB segment signals and sending, at a first responding device, N second UWB segment signals, or and sending, at a first responding device, N first orthogonal UWB segment signals, and the first responding device is any one of the M second responding devices.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N first ultra-wideband UWB segment signals, a same response time at which M second responding devices reply to a first initiating device with a response frame, and subcarrier sets for all first responding devices in the M second responding devices to reply to the first initiating device with the response frame, where a narrowband signal transmitted at the response time includes a plurality of subcarriers, and N and M are integers greater than or equal to 2. The communication unit 1501 is further configured to send a response signal to the first initiating device based on the response time and a subcarrier set for a first responding device to reply to the first initiating device with the response frame, where the first responding device is any one of the M second responding devices.

In an optional implementation, the poll frame further includes second delay information for each second responding device to reply to the first UWB segment signals that are from the first initiating device. The communication unit 1501 is further configured to: separately receive, by the first responding device, the N first UWB segment signals based on the time-frequency location information of the N first UWB segment signals; and separately send N second UWB segment signals to the first initiating device based on the second delay information for the first responding device to reply to the first UWB segment signals that are from the first initiating device.

In an optional implementation, the poll frame further includes a same piece of third delay information for the M second responding devices to reply to the first UWB segment signals that are from the first initiating device, and an orthogonal sequence index of each second responding device. The communication unit 1501 is further configured to: separately receive the N first UWB segment signals based on the time-frequency location information of the N first UWB segment signals; and separately send N first orthogonal UWB segment signals to the first initiating device based on the third delay information, where the first orthogonal UWB segment signals are determined based on the orthogonal sequence index of the first responding device.

In an optional implementation, the poll frame further includes a same data frame time at which all the second responding devices send a data frame to the first initiating device, and subcarrier sets for all the second responding devices to send the data frame to the first initiating device. The communication unit 1501 is further configured to send a data signal to the first initiating device based on the data frame time and the subcarrier set for the first responding device to send the data frame to the first initiating device, where the data signal includes times time difference between receiving, at a first responding device, the N first UWB segment signals and sending, at a first responding device, N second UWB segment signals, or and sending, at a first responding device, N first orthogonal UWB segment signals.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending.

The communication unit 1501 is configured to send a poll frame. The poll frame includes time-frequency location information of N ultra-wideband UWB segment signal groups, first delay information for each of M second responding devices to reply to a control device with a response frame, and fifth delay information for each of X second initiating devices to reply to the control device with a response frame, where N, M, and X are integers greater than or equal to 2. The communication unit 1501 is further configured to receive a plurality of response frames based on multiple pieces of first delay information, multiple pieces of fifth delay information, and a timestamp of the poll frame.

In an optional implementation, the poll frame further includes an orthogonal sequence index of each second initiating device, an orthogonal sequence index of each of the M second responding devices, and a same piece of third delay information for all second responding devices to reply to a first initiating device with third orthogonal UWB segment signals.

In another optional implementation, the poll frame further includes fourth delay information for each second responding device to send a data frame to a second initiating device.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N ultra-wideband UWB segment signal groups, and fifth delay information for each of X second initiating devices to reply to a control device with a response frame, where a first initiating device is any one of the X second initiating devices, and N and X are integers greater than or equal to 2. The communication unit 1501 is further configured to send a response frame to the control device based on a timestamp of the poll frame and the fifth delay information for the first initiating device to reply to the control device with the response frame.

In an optional implementation, the poll frame further includes an orthogonal sequence index of each second initiating device, an orthogonal sequence index of each of M second responding devices, and a same piece of third delay information for all second responding devices to reply to first UWB segment signals that are from the first initiating device, where M is an integer greater than or equal to 2. The communication unit 1501 is further configured to: separately send N second orthogonal UWB segment signals based on the time-frequency location information of the N UWB segment signal groups and the orthogonal sequence index of the first initiating device; and separately receive a plurality of third orthogonal UWB segment signals based on the third delay information and the orthogonal sequence index of each second responding device.

In another optional implementation, the poll frame further includes fourth delay information for each second responding device to send a data frame to a second initiating device. The communication unit 1501 is further configured to receive a plurality of data frames based on the fourth delay information for each second responding device to send the data frame to the second initiating device, where each of the plurality of data frames includes times at which a first responding device receives a plurality of second orthogonal UWB segment signals and times at which the first responding device sends a plurality of third orthogonal UWB segment signals, and the first responding device is any one of the M second responding devices.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N ultra-wideband UWB segment signal groups, and first delay information for each of M second responding devices to reply to a control device with a response frame, where a first responding device is any one of the M second responding devices, and N and M are integers greater than or equal to 2. The communication unit 1501 is further configured to send a response frame to the control device based on a timestamp of the poll frame and the first delay information for the first responding device to reply to the control device with the response frame.

In an optional implementation, the poll frame further includes an orthogonal sequence index of each of X second initiating devices, an orthogonal sequence index of each second responding device, and a same piece of third delay information for all second responding devices to reply to first UWB segment signals from a first initiating device, where X is an integer greater than or equal to 2. The communication unit 1501 is further configured to: separately receive a plurality of second orthogonal UWB segment signals based on the time-frequency location information of the N UWB segment signal groups and the orthogonal sequence indexes of the X second initiating devices; and separately send a plurality of third orthogonal UWB segment signals based on the third delay information and the orthogonal sequence index of the first responding device.

In an optional implementation, the poll frame further includes fourth delay information for each second responding device to send a data frame to a second initiating device. The communication unit 1501 is further configured to send a data frame based on the fourth delay information for the first responding device to send the data frame to the second initiating device, where the data frame includes times at which the first responding device receives the plurality of second orthogonal UWB segment signals and times at which the first responding device sends the plurality of third orthogonal UWB segment signals.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to send a poll frame. The poll frame includes time-frequency location information of N ultra-wideband UWB segment signal groups. The poll frame includes time-frequency location information of N ultra-wideband UWB segment signal groups, a first response time at which X second initiating devices reply to a control device with a response frame, subcarrier sets for all of the X second initiating devices to reply to the control device with the response frame, a second response time at which M second responding devices reply to the control device with a response frame, and subcarrier sets for all of the M second responding devices to reply to the control device with the response frame, where N, M, and X are integers greater than or equal to 2.

The communication unit 1501 is further configured to: receive a second response frame based on the same second response time at which the M second responding devices reply to the control device with the response frame and the subcarrier sets for all the second responding devices to reply to the control device with the response frame, where the second response frame includes a plurality of second response signals; and receive a first response frame based on the same first response time at which the X second initiating devices reply to the control device with the response frame and the subcarrier sets for all the second initiating devices to reply to the control device with the response frame, where the first response frame includes a plurality of first response signals.

In an optional implementation, the poll frame further includes an orthogonal sequence index of each second initiating device, an orthogonal sequence index of each of the M second responding devices, and a same piece of third delay information for all second responding devices to reply to first UWB segment signals from a first initiating device.

In another optional implementation, the poll frame further includes a data frame time at which the M second responding devices send a data frame to a second initiating device, and subcarrier sets for all of the M second responding devices to send the data frame to the second initiating device.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N ultra-wideband UWB segment signal groups, a same first response time at which X second initiating devices reply to a control device with a response frame, and subcarrier sets for all of the X second initiating devices to reply to the control device with the response frame, where a first initiating device is any one of the X second initiating devices, and N and X are integers greater than or equal to 2. The communication unit 1501 is further configured to send a first response signal based on the first response time and the subcarrier set for the first initiating device to reply to the control device with the response frame.

In an optional implementation, the poll frame further includes an orthogonal sequence index of each second initiating device, an orthogonal sequence index of each of M second responding devices, and a same piece of third delay information for all second responding devices to reply to first UWB segment signals from a second initiating device, where M is an integer greater than or equal to 2. The communication unit 1501 is further configured to: separately send N second orthogonal UWB segment signals based on the time-frequency location information of the N first UWB segment signal groups and the orthogonal sequence index of the first initiating device; and separately receive a plurality of third orthogonal UWB segment signals based on the third delay information and the orthogonal sequence index of each second responding device.

In an optional implementation, the poll frame further includes a same data frame time at which all the second responding devices send a data frame to the first initiating device, and subcarrier sets for all the second responding devices to send the data frame to the first initiating device. The communication unit 1501 is further configured to receive the data frame based on the data frame time and the subcarrier sets for all the second responding devices to send the data frame to the first initiating device, where the data frame includes a plurality of data signals, each of the plurality of data signals includes times at which a first responding device receives a plurality of second orthogonal UWB segment signals and times at which the first responding device sends a plurality of third orthogonal UWB segment signals, and the first responding device is any one of the M second responding devices.

This embodiment of this application and the foregoing method embodiment are based on a same concept, and bring same technical effect. For a specific principle, refer to the descriptions of the foregoing embodiment. Details are not described again.

In still another possible design, a communication apparatus 1500 may include a processing unit 1502 and a communication unit 1501. The processing unit 1502 is configured to control the communication unit 1501 to perform data/signaling receiving and sending. The communication unit 1501 is configured to receive a poll frame. The poll frame includes time-frequency location information of N ultra-wideband UWB segment signal groups, a same second response time at which M second responding devices reply to a control device with a response frame, and subcarrier sets for all of the M second responding devices to reply to the control device with the response frame, where N and M are integers greater than or equal to 2, and a first responding device is any one of the M second responding devices. The communication unit 1501 is further configured to send a second response signal based on the second response time and the subcarrier set for the first responding device to reply to the control device with the response frame.

In an optional implementation, the poll frame further includes an orthogonal sequence index of each of X second initiating devices, an orthogonal sequence index of each second responding device, and a same piece of third delay information for all second responding devices to reply to first UWB segment signals from a first initiating device, where the first initiating device is any one of the X second initiating devices, and M is an integer greater than or equal to 2. The communication unit 1501 is further configured to: receive a plurality of second orthogonal UWB segment signals based on the time-frequency location information of the N UWB segment signal groups and the orthogonal sequence index of each second initiating device; and separately send a plurality of third orthogonal UWB segment signals based on the third delay information and the orthogonal sequence index of the first responding device.

In another optional implementation, the poll frame further includes a same data frame time at which all the second responding devices send a data frame to the first initiating device, and subcarrier sets for all the second responding devices to send the data frame to the first initiating device. The communication unit 1501 is further configured to send a data signal based on the data frame time and the subcarrier set for the first responding device to send the data frame to the first initiating device, where the data signal includes times at which the first responding device receives a plurality of second orthogonal UWB segment signals and times at which the first responding device sends a plurality of third orthogonal UWB segment signals.

This embodiment of this application and the foregoing method embodiment are based on a same concept, and bring same technical effect. For a specific principle, refer to the descriptions of the foregoing embodiment. Details are not described again.

Figure 16:
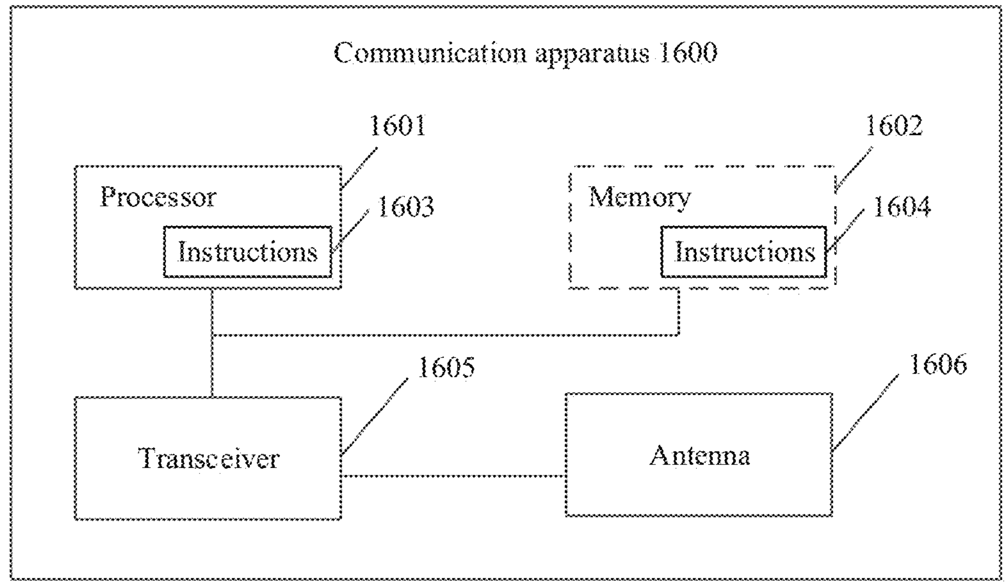
FIG. 16 is a diagram of a structure of another communication apparatus according to an embodiment of this application.

An embodiment of this application further provides a communication apparatus 1600. FIG. 16 is a diagram of a structure of the communication apparatus 1600. The communication apparatus 1600 may be a first initiating device, a first responding device, or a control device, or may be a chip, a chip system, a processor, or the like that supports the first initiating device, the first responding device, or the control device in implementing the foregoing methods. The apparatus may be configured to implement the methods described in the foregoing method embodiments. For details, refer to the descriptions in the foregoing method embodiments.

The communication apparatus 1600 may include one or more processors 1601. The processor 1601 may be a general-purpose processor, a dedicated processor, or the like. For example, the processor may be a baseband processor, a digital signal processor, an application-specific integrated circuit, a field programmable gate array or another programmable logic device, a discrete gate or a transistor logic device, a discrete hardware component, or a central processing unit (Central Processing Unit, CPU). The baseband processor may be configured to process a communication protocol and communication data. The central processing unit may be configured to control the communication apparatus (for example, a base station, a baseband chip, a terminal, a terminal chip, a distributed unit (distributed unit, DU), or a central unit (central unit, CU)), execute a software program, and process data of the software program.

Optionally, the communication apparatus 1600 may include one or more memories 1602. The memory 1602 stores instructions 1604, and the instructions may be run on the processor 1601, to enable the communication apparatus 1600 to perform the methods described in the foregoing method embodiments. Optionally, the memory 1602 may further store data. The processor 1601 and the memory 1602 may be separately disposed, or may be integrated together.

The memory 1602 may include but is not limited to a non-volatile memory such as a hard disk drive (hard disk drive, HDD) or a solid-state drive (solid-state drive, SSD), a random access memory (Random Access Memory, RAM), an erasable programmable read-only memory (Erasable Programmable ROM, EPROM), a ROM, or a portable read-only memory (Compact Disc Read-Only Memory, CD-ROM).

Optionally, the communication apparatus 1600 may further include a transceiver 1605 and an antenna 1606. The transceiver 1605 may be referred to as a transceiver unit, a transceiver machine, a transceiver circuit, or the like, and is configured to implement a transceiver function. The transceiver 1605 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

When the communication apparatus 1600 is the first initiating device, the transceiver 1605 is configured to perform S101, S104, S105, and S108 in the signal transmission method 100, perform S201, S204, S205, and S208 in the signal transmission method 200, perform S302, S304, S307, and S310 in the signal transmission method 300, and perform S402, S404, S408, and S411 in the signal transmission method 400.

When the communication apparatus 1600 is the first responding device, the transceiver 1605 is configured to perform S102, S103, S106, and S107 in the signal transmission method 100, perform S202, S203, S206, and S207 in the signal transmission method 200, perform S303, S305, S308, and S309 in the signal transmission method 300, and perform S403, S405, S409, and S410 in the signal transmission method 400.

When the communication apparatus 1600 is the control device, the transceiver 1605 is configured to perform S301 and S306 in the signal transmission method 300, and perform S401, S406, and S407 in the signal transmission method 300.

In another possible design, the processor 1601 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read or write code/data; or the transceiver circuit, the interface, or the interface circuit may be configured to perform signal transmission or transferring.

In still another possible design, optionally, the processor 1601 may store instructions 1603, and the instructions 1603 are run on the processor 1601, so that the communication apparatus 1600 can perform the methods described in the foregoing method embodiments. The instructions 1603 may be fixed in the processor 1601, and in this case, the processor 1601 may be implemented by using hardware.

In yet another possible design, the communication apparatus 1600 may include a circuit. The circuit may implement a sending, receiving, or communication function in the foregoing method embodiments. The processor and the transceiver described in embodiments of this application may be implemented on an integrated circuit (integrated circuit, IC), an analog IC, a radio frequency integrated circuit (radio frequency integrated circuit, RFIC), a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC process technologies, for example, a complementary metal oxide semiconductor (complementary metal oxide semiconductor, CMOS), an N-type metal oxide semiconductor (N-type metal oxide semiconductor, NMOS), a P-type metal oxide semiconductor (P-type metal oxide semiconductor, PMOS), a bipolar junction transistor (Bipolar Junction Transistor, BJT), a bipolar CMOS (BiCMOS), silicon germanium (SiGe), and gallium arsenide (GaAs).

The communication apparatus described in the foregoing embodiments may be a first communication apparatus or a second communication apparatus. However, a scope of the communication apparatus described in embodiments of this application is not limited thereto, and a structure of the communication apparatus may not be limited by FIG. 16. The communication apparatus may be an independent device or may be a part of a large device. For example, the communication apparatus may be:

(1) an independent integrated circuit IC, a chip, or a chip system or subsystem;

(2) a set that has one or more ICs, where optionally, the IC set may alternatively include a storage component configured to store data and instructions;

(3) an ASIC, like a modem (modulator);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 17:
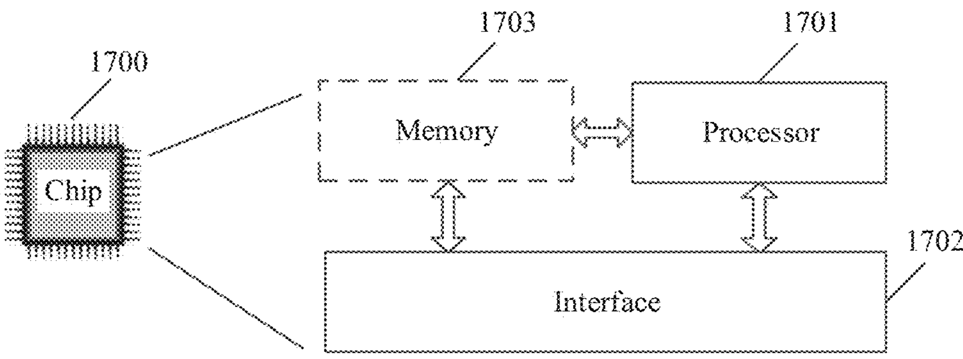
FIG. 17 is a diagram of a structure of a chip according to an embodiment of this application.

For a case in which the communication apparatus may be the chip or the chip system, refer to a diagram of a structure of a chip shown in FIG. 17. A chip 1700 shown in FIG. 17 includes a processor 1701 and an interface 1702. There may be one or more processors 1701, and there may be a plurality of interfaces 1702. The processor 1701 may be a logic circuit, and the interface 1702 may be an input/output interface, an input interface, or an output interface. The chip 1700 may further include a memory 1703.

In a design, for a case in which the chip is configured to implement a function of the first initiating device in embodiments of this application, details are as follows: The processor 1701 is configured to control the interface 1702 to perform outputting or receiving.

The interface 1702 is configured to send a poll frame. The poll frame includes time-frequency location information of N first ultra-wideband UWB segment signals, and first delay information for each of M second responding devices to reply to the first initiating device with a response frame, where N and M are integers greater than or equal to 2. The interface 1702 is further configured to receive a plurality of response frames based on a timestamp of the poll frame and the first delay information for each second responding device to reply to the first initiating device with the response frame.

In another design, for a case in which the chip is configured to implement a function of the first responding device in embodiments of this application, details are as follows: The interface 1702 is configured to receive a poll frame. The poll frame includes time-frequency location information of N first ultra-wideband UWB segment signals, and first delay information for each of M second responding devices to reply to a first initiating device with a response frame, where N and M are integers greater than or equal to 2, and the first responding device is any one of the M second responding devices. The interface 1702 is further configured to send a response frame to the first initiating device based on a timestamp of the poll frame and the first delay information for the first responding device to reply to the first initiating device with the response frame.

In still another design, for a case in which the chip is configured to implement a function of the first initiating device in embodiments of this application, details are as follows:

The interface 1702 is configured to send a poll frame. The poll frame includes time-frequency location information of N first ultra-wideband UWB segment signals, a same response time at which M second responding devices reply to the first initiating device with a response frame, and subcarrier sets for all of the M second responding devices to reply to the first initiating device with the response frame, where a narrowband signal transmitted at the response time includes a plurality of subcarriers, and N and M are integers greater than or equal to 2. The interface 1702 is further configured to receive the response frame based on the response time and the subcarrier sets for all the second responding devices to reply to the first initiating device with the response frame, where the response frame includes a plurality of response signals.

In still another design, for a case in which the chip is configured to implement a function of the first responding device in embodiments of this application, details are as follows:

The interface 1702 is configured to receive a poll frame. The poll frame includes time-frequency location information of N first ultra-wideband UWB segment signals, a same response time at which M second responding devices reply to a first initiating device with a response frame, and subcarrier sets for all first responding devices in the M second responding devices to reply to the first initiating device with the response frame, where a narrowband signal transmitted at the response time includes a plurality of subcarriers, and N and M are integers greater than or equal to 2. The interface 1702 is further configured to send a response signal to the first initiating device based on the response time and a subcarrier set for the first responding device to reply to the first initiating device with the response frame, where the first responding device is any one of the M second responding devices.

In still another design, for a case in which the chip is configured to implement a function of the control device in embodiments of this application, details are as follows:

The interface 1702 is configured to send a poll frame. The poll frame includes time-frequency location information of N ultra-wideband UWB segment signal groups, first delay information for each of M second responding devices to reply to the control device with a response frame, and fifth delay information for each of X second initiating devices to reply to the control device with a response frame, where N, M, and X are integers greater than or equal to 2. The interface 1702 is further configured to receive a plurality of response frames based on multiple pieces of first delay information, multiple pieces of fifth delay information, and a timestamp of the poll frame.

In still another design, for a case in which the chip is configured to implement a function of the first initiating device in embodiments of this application, details are as follows:

The interface 1702 is configured to receive a poll frame. The poll frame includes time-frequency location information of N ultra-wideband UWB segment signal groups, and fifth delay information for each of X second initiating devices to reply to a control device with a response frame, where the first initiating device is any one of the X second initiating devices, and N and X are integers greater than or equal to 2. The interface 1702 is further configured to send a response frame to the control device based on a timestamp of the poll frame and the fifth delay information for the first initiating device to reply to the control device with the response frame.

In still another design, for a case in which the chip is configured to implement a function of the first responding device in embodiments of this application, details are as follows:

The interface 1702 is configured to receive a poll frame. The poll frame includes time-frequency location information of N ultra-wideband UWB segment signal groups, and first delay information for each of M second responding devices to reply to a control device with a response frame, where the first responding device is any one of the M second responding devices, and N and M are integers greater than or equal to 2. The interface 1702 is further configured to send a response frame to the control device based on a timestamp of the poll frame and the first delay information for the first responding device to reply to the control device with the response frame.

In still another design, for a case in which the chip is configured to implement a function of the control device in embodiments of this application, details are as follows:

The interface 1702 is configured to send a poll frame. The poll frame includes time-frequency location information of N ultra-wideband UWB segment signal groups. The poll frame includes time-frequency location information of N ultra-wideband UWB segment signal groups, a same second response time at which M second responding devices reply to the control device with a response frame, subcarrier sets for all of the M second responding devices to reply to the control device with the response frame, a same first response time at which X second initiating devices reply to the control device with a response frame, and subcarrier sets for all of the X second initiating devices to reply to the control device with the response frame, where a narrowband signal transmitted at the response time includes a plurality of subcarriers, and N, M, and X are integers greater than or equal to 2.

The interface 1702 is further configured to: receive a second response frame based on the same second response time at which the M second responding devices reply to the control device with the response frame and the subcarrier sets for all the second responding devices to reply to the control device with the response frame, where the second response frame includes a plurality of second response signals; and receive a first response frame based on the same first response time at which the X second initiating devices reply to the control device with the response frame and the subcarrier sets for all the second initiating devices to reply to the control device with the response frame, where the first response frame includes a plurality of first response signals.

In still another design, for a case in which the chip is configured to implement a function of the first initiating device in embodiments of this application, details are as follows:

The interface 1702 is configured to receive a poll frame. The poll frame includes time-frequency location information of N ultra-wideband UWB segment signal groups, a same first response time at which X second initiating devices reply to a control device with a response frame, and subcarrier sets for all of the X second initiating devices to reply to the control device with the response frame, where the first initiating device is any one of the X second initiating devices, and N and X are integers greater than or equal to 2. The interface 1702 is further configured to send a first response signal based on the first response time and the subcarrier set for the first initiating device to reply to the control device with the response frame.

In still another design, for a case in which the chip is configured to implement a function of the first responding device in embodiments of this application, details are as follows:

The interface 1702 is configured to receive a poll frame. The poll frame includes time-frequency location information of N ultra-wideband UWB segment signal groups, a same second response time at which M second responding devices reply to a control device with a response frame, and subcarrier sets for all of the M second responding devices to reply to the control device with the response frame, where N and M are integers greater than or equal to 2, and the first responding device is any one of the M second responding devices. The interface 1702 is further configured to send a second response signal based on the second response time and the subcarrier set for the first responding device to reply to the control device with the response frame.

In embodiments of this application, the communication apparatus 1600 and the chip 1700 may further perform the implementations of the communication apparatus 1500. A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

This embodiment of this application and the method embodiments shown in the signal transmission method 100 to the signal transmission method 400 are based on a same concept, and bring same technical effect. For a specific principle, refer to the descriptions of the embodiments shown in the signal transmission method 100 to the signal transmission method 400. Details are not described again.

This application further provides a computer-readable storage medium, configured to store computer software instructions. When the instructions are executed by a communication apparatus, a function in any one of the foregoing method embodiments is implemented.

This application further provides a computer program product, configured to store computer software instructions. When the instructions are executed by a communication apparatus, a function in any one of the foregoing method embodiments is implemented.

This application further provides a computer program. When the computer program is run on a computer, a function in any one of the foregoing method embodiments is implemented.

This application further provides a communication system. The system includes at least one first initiating device and at least two first responding devices in the foregoing aspects. In another possible design, the system may further include another device that interacts with the first initiating device and the first responding device in the solutions provided in this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, an SSD), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for signal transmission, wherein the method is applied to a first initiating device, and the method comprises:

sending a poll frame, wherein the poll frame comprises time-frequency location information of N first ultra-wideband (UWB) segment signals, and the poll frame further comprises first delay information for each of M second responding devices to reply to the first initiating device with a response frame, and wherein N and M are integers greater than or equal to 2; and receiving a plurality of response frames based on a timestamp of the poll frame and the first delay information for each of the M second responding devices.

2. The method according to claim 1, wherein:

the poll frame comprises second delay information for each of the M second responding devices to reply to the first UWB segment signals that are from the first initiating device; and the method further comprises:

separately sending the N first UWB segment signals based on the time-frequency location information of the N first UWB segment signals; and separately receiving a plurality of second UWB segment signals based on the second delay information for each of the M second responding devices to reply to the first UWB segment signals that are from the first initiating device.

3. The method according to claim 1, wherein:

the poll frame comprises second delay information for each of the M second responding devices to send a data frame to the first initiating device; and the method further comprises: receiving a plurality of data frames based on the second delay information for each of the M second responding devices to send the data frame to the first initiating device, wherein:

each of the plurality of data frames comprises a time difference between a time at which a first responding device receives the N first UWB segment signals and a time at which a first responding device sends N second UWB segment signals; or each of the plurality of data frames comprises a time difference between a time at which a first responding device receives the N first UWB segment signals and a time at which a first responding device sends N first orthogonal UWB segment signals; and the first responding device is any one of the M second responding devices.

4. The method according to claim 2, wherein the separately sending the N first UWB segment signals based on the time-frequency location information of the N first UWB segment signals comprises:

when a first timer does not expire and M response frames are received, separately sending the N first UWB segment signals based on the time-frequency location information of the N first UWB segment signals; or when S response frames are received and a first timer expires, separately sending the N first UWB segment signals based on the time-frequency location information of the N first UWB segment signals, wherein the first timer is triggered when the poll frame is sent, and S is an integer greater than or equal to 1 and less than M.

5. A method for signal transmission, wherein the method is applied to a first responding device, and the method comprises:

receiving a poll frame, wherein the poll frame comprises time-frequency location information of N first ultra-wideband (UWB) segment signals, and the poll frame further comprises delay information for each of M second responding devices to reply to a first initiating device with a response frame, wherein N and M are integers greater than or equal to 2, and the first responding device is any one of the M second responding devices; and sending a first response frame to the first initiating device based on a timestamp of the poll frame and the delay information for the first responding device to reply to the first initiating device with the response frame.

6. The method according to claim 5, wherein:

the poll frame comprises delay information for each of the M second responding devices to reply to the first UWB segment signals that are from the first initiating device; and the method further comprises:

separately receiving the N first UWB segment signals based on the time-frequency location information of the N first UWB segment signals; and separately sending N second UWB segment signals to the first initiating device based on the delay information for the first responding device to reply to the first UWB segment signals that are from the first initiating device.

7. The method according to claim 5, wherein:

the poll frame comprises delay information for each of the M second responding devices to send a data frame to the first initiating device; and the method further comprises: sending a data frame to the first initiating device based on the delay information for the first responding device to send the data frame to the first initiating device, wherein:

the data frame comprises a time difference between a time at which a first responding device receives the N first UWB segment signals and a time at which a first responding device sends N second UWB segment signals; or the data frame comprises a time difference between a time at which a first responding device receives the N first UWB segment signals and a time at which a first responding device sends N first orthogonal UWB segment signals.

8. An apparatus for communication, wherein the apparatus is used in a first initiating device, and the apparatus comprises:

one or more processors; and one or more memories coupled to the one or more processors and storing programming instructions for execution by the one or more processors to:

send a poll frame, wherein the poll frame comprises time-frequency location information of N first ultra-wideband (UWB) segment signals, and the poll frame further comprises first delay information for each of M second responding devices to reply to the first initiating device with a response frame, and wherein N and M are integers greater than or equal to 2; and receive a plurality of response frames based on a timestamp of the poll frame and the first delay information for each of the M second responding devices.

9. The apparatus according to claim 8, wherein:

the poll frame comprises second delay information for each of the M second responding devices to reply to the first UWB segment signals that are from the first initiating device; and the one or more memories store programming instructions for execution by the one or more processors to:

separately send the N first UWB segment signals based on the time-frequency location information of the N first UWB segment signals; and separately receive a plurality of second UWB segment signals based on the second delay information for each of the M second responding devices to reply to the first UWB segment signals that are from the first initiating device.

10. The apparatus according to claim 8, wherein:

the poll frame comprises second delay information for each of the M second responding devices to send a data frame to the first initiating device; and the one or more memories store programming instructions for execution by the one or more processors to: receive a plurality of data frames based on the second delay information for each second responding device to send the data frame to the first initiating device, wherein:

each of the plurality of data frames comprises a time difference between a time at which a first responding device receives the N first UWB segment signals and a time at which a first responding device sends N second UWB segment signals; or each of the plurality of data frames comprises a time difference between a time at which a first responding device receives the N first UWB segment signals and a time at which a first responding device sends N first orthogonal UWB segment signals; and the first responding device is any one of the M second responding devices.

11. The apparatus according to claim 9, wherein the separately sending the N first UWB segment signals based on the time-frequency location information of the N first UWB segment signals comprises:

when a first timer does not expire and M response frames are received, separately send the N first UWB segment signals based on the time-frequency location information of the N first UWB segment signals; or when S response frames are received and a first timer expires, separately send the N first UWB segment signals based on the time-frequency location information of the N first UWB segment signals, wherein the first timer is triggered when the poll frame is sent, and S is an integer greater than or equal to 1 and less than M.

* * * * *